(12) United States Patent
Dinh et al.

(10) Patent No.: US 12,170,786 B2
(45) Date of Patent: Dec. 17, 2024

(54) DEVICE AND METHOD FOR ENCODING AND DECODING IMAGE USING AI

(71) Applicant: SAMSUNG ELECTRONICS CO., LTD., Suwon-si (KR)

(72) Inventors: Quockhanh Dinh, Suwon-si (KR); Kwangpyo Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 66 days.

(21) Appl. No.: 18/133,369

(22) Filed: Apr. 11, 2023

(65) Prior Publication Data

US 2023/0247212 A1   Aug. 3, 2023

Related U.S. Application Data

(63) Continuation of application No. PCT/KR2022/013650, filed on Sep. 13, 2022.

(30) Foreign Application Priority Data

Sep. 17, 2021  (KR) .................. 10-2021-0125277
Aug. 24, 2022  (KR) .................. 10-2022-0106058

(51) Int. Cl.
*G06T 9/00*       (2006.01)
*H04N 19/137*     (2014.01)
(Continued)

(52) U.S. Cl.
CPC .............. *H04N 19/42* (2014.11); *G06T 9/00* (2013.01); *H04N 19/137* (2014.11); *H04N 19/52* (2014.11)

(58) Field of Classification Search
CPC ...................................................... G06T 9/00
See application file for complete search history.

(56) References Cited

U.S. PATENT DOCUMENTS 9,420,305 B2    8/2016  Lakshman et al.
10,825,140 B1  11/2020  Yang et al.
(Continued)

FOREIGN PATENT DOCUMENTS

CN    103098476 B   11/2016
CN    111901596 B   10/2021
(Continued)

OTHER PUBLICATIONS

Agustsson, E., et al., "Scale-space flow for end-to-end optimized video compression" Computer Vision Foundation, (Aug. 5, 2020), pp. 8503-8512, 10 pages.
(Continued)

Primary Examiner — Young Lee
(74) Attorney, Agent, or Firm — Sughrue Mion, PLLC

(57) ABSTRACT

An image decoding method includes obtaining feature data of a current optical flow and feature data of a current residual image from a bitstream; obtaining the current optical flow and first weight data by applying the feature data of the current optical flow to an optical flow decoder; obtaining the current residual image by applying the feature data of the current residual image to a residual decoder; obtaining a preliminary prediction image from the previous reconstructed image, based on the current optical flow; obtaining a final prediction image by applying sample values of the first weight data to sample values of the preliminary prediction image; and obtaining a current reconstructed image corresponding to the current image by combining the final prediction image with the current residual image.

13 Claims, 26 Drawing Sheets

(51) Int. Cl.
*H04N 19/42* (2014.01)
*H04N 19/52* (2014.01)

(56) References Cited

U.S. PATENT DOCUMENTS

| | | | |
|---|---|---|---|
| 11,055,516 | B2 | 7/2021 | Zhu et al. |
| 11,265,540 | B2 | 3/2022 | Na et al. |
| 11,430,263 | B2 | 8/2022 | Nirenberg |
| 11,532,090 | B2 | 12/2022 | Chen et al. |
| 2019/0392591 | A1 | 12/2019 | Lee et al. |
| 2020/0236349 | A1 | 7/2020 | Zhai et al. |
| 2020/0272903 | A1 | 8/2020 | Rippel et al. |
| 2021/0004969 | A1 | 1/2021 | Pourian et al. |
| 2021/0337213 | A1 | 10/2021 | Srinivasan et al. |
| 2022/0159290 | A1 | 5/2022 | Bordes et al. |

FOREIGN PATENT DOCUMENTS

| | | |
|---|---|---|
| KR | 10-0643819 B1 | 11/2006 |
| KR | 10-2017-0139087 | 12/2017 |
| KR | 10-2019-0117352 A | 10/2019 |
| KR | 10-2020-0140096 A | 12/2020 |
| KR | 10-2021-0133973 A | 11/2021 |

OTHER PUBLICATIONS

Lu, G., et al., "DVC: An End-to-end Deep Video Compression Framework", 14 pages. arXiv: 1812.00101v3 [eess.IV] Apr. 7, 2019.
Buades, A., et al., "A non-local algorithm for image denoising", CVPR2005 (Jul. 25, 2005), 6 pages.
Mentzer, F., et al., "Neural Video Compression using GANs for Detail Synthesis and Propagation", (Jul. 12, 2022), 28 pages.
Zhang, F., et al., BVI-DVC, (Apr. 1, 2020) https://research-information.bris.ac.uk/en/datasets/bvi-dvc, 16 pages.
MCL-JCV Dataset, USC Media Communications Lab, 3 pages, http://mcl.usc.edu/mcl-jcv-dataset (2013).
Hu, Z., et al., 'FVC: A New Framework towards Deep Video Compression in Feature Space', (May 31, 2021), pp. 1-10, arXiv:2105.09600v1.
International Search Report and Written Opinion (PCT/ISA/210, PCT/ISA/237) issued from the International Searching Authority on Dec. 23, 2022 to International Application No. PCT/KR2022/013650.

DEVICE AND METHOD FOR ENCODING AND DECODING IMAGE USING AI

CROSS-REFERENCE TO RELATED APPLICATION(S)

This application is a by-pass continuation of International Application No. PCT/KR2022/013650, filed on Sep. 13, 2022, which is based on and claims priority to Korean Patent Application No. 10-2021-0125277, filed on Sep. 17, 2021, and Korean Patent Application No. 10-2022-0106058, filed on Aug. 24, 2022, in the in the Korean Intellectual Property Office, the disclosures of which are incorporated by reference herein in their entireties.

BACKGROUND

1. Field

The disclosure relates to image encoding and decoding. More particularly, the disclosure relates to a technology for encoding and decoding an image by using artificial intelligence (AI), for example, a neural network.

2. Description of the Related Art

Codecs such as H.264 advanced video coding (AVC) and high efficiency video coding (HEVC) divide an image into blocks and predictively encode and decode each block through inter prediction or intra prediction.

Intra prediction is a method of compressing an image by removing spatial redundancy in the image, whereas inter prediction is a method of compressing an image by removing temporal redundancy between images.

A representative example of inter prediction is motion estimation coding, which predicts blocks of a current image by using a reference image. For example, a reference block in the reference image that is the most similar to a current block in the current image may be found in a certain range by using a certain evaluation function. The current block is predicted based on the reference block, and a prediction block generated as a result of prediction is subtracted from the current block to generate a residual block, which is encoded.

In order to derive a motion vector indicating the reference block in the reference image, a motion vector of previously encoded blocks may be used as a motion vector predictor of the current block. A differential motion vector corresponding to a difference between a motion vector of the current block and the motion vector predictor of the current block is transmitted to a decoder side through a certain method.

Recently, techniques for encoding and/or decoding an image by using artificial intelligence (AI) have been proposed, and a method for effectively encoding and/or decoding an image using AI, for example, a neural network, is required.

SUMMARY

According to an aspect of the disclosure, there is provided an image decoding method based on artificial intelligence (AI), the image decoding method including: obtaining first feature data and second feature data from a bitstream, obtaining a current optical flow and first weight data by applying the first feature data to an optical flow decoder; obtaining a current residual image by applying the second feature data to a residual decoder; obtaining a first prediction image from a previous reconstructed image, based on the current optical flow; obtaining a second prediction image by applying a first sample value of the first weight data to a second sample value of the first prediction image; and obtaining a current reconstructed image corresponding to a current image by combining the second prediction image with the current residual image.

The optical flow decoder may be trained to reduce sample values of a residual training image or a bitrate of a bitstream including feature data of the residual training image, and wherein the residual training image corresponds to a difference between a final prediction training image corresponding to the second prediction image and a current training image corresponding to the current image.

The optical flow decoder may be trained such that, the smaller a difference between the second sample value in the first prediction image and a third sample value located at a same position in the current image is, the closer the first sample value in the first weight data is to 1.

The optical flow decoder may be trained such that when the second sample value in the first prediction image is greater than a third sample value located at a same position in the current image, the first sample value in the first weight data is less than 1.

The optical flow decoder may be trained such that, when the second sample value in the first prediction image is less than a third sample value located at a same position in the current image, the first sample value in the first weight data is greater than 1.

The image decoding method may further include obtaining a plurality of current optical flows, the first weight data, and a plurality of second weight data by processing the first feature data by the optical flow decoder, wherein the obtaining of the first prediction image may include: obtaining a plurality of first prediction images from the previous reconstructed image, based on the plurality of current optical flows, and wherein the obtaining of the second prediction image includes: obtaining a plurality of modified prediction images by applying the plurality of second weight data to the plurality of first prediction images; obtaining a third prediction image by combining the plurality of modified prediction images; and obtaining the second prediction image by applying the first sample value of the first weight data to a fourth sample value of the third prediction image.

The optical flow decoder may include a plurality of optical flow decoders, and wherein each of the plurality of optical flow decoders outputs a pair including a current optical flow, among the plurality of current optical flows and second weight data, among the plurality of second weight data.

A sum of a plurality of sample values located at a same position in the plurality of second weight data may be 1.

According to another aspect of the disclosure, there is provided a computer-readable recording medium having recorded thereon a program which performs the image decoding method.

According to another aspect of the disclosure, there is provided an image decoding apparatus based on artificial intelligence (AI), the image decoding apparatus including: an obtainer configured to obtain first feature data and second feature data from a bitstream, and a prediction decoder configured to: obtain a current optical flow and first weight data by applying the first feature data to an optical flow decoder, obtain a current residual image by applying the second feature data to a residual decoder, obtain a first prediction image from a previous reconstructed image, based on the current optical flow, obtain a second prediction image by applying a first sample value of the first weight data to a second sample value of the first prediction image, and obtain a current reconstructed image corresponding to a current image by combining the second prediction image with the current residual image.

According to another aspect of the disclosure, there is provided an image encoding method based on artificial intelligence (AI), the image encoding method including: obtaining first feature data by applying a current image and a previous reconstructed image to an optical flow encoder; obtaining a current optical flow and first weight data by applying the first feature data of the current optical flow to an optical flow decoder; obtaining a first prediction image from the previous reconstructed image, based on the current optical flow; obtaining a second prediction image by applying a first sample value of the first weight data to a second sample value of the first prediction image; obtaining a current residual image corresponding to a difference between the second prediction image and the current image; obtaining second feature data of the current residual image by applying the current residual image to a residual encoder; and generating a bitstream including the first feature data corresponding to the current optical flow and the second feature data corresponding to the current residual image.

The image encoding method further including obtaining a plurality of current optical flows, the first weight data, and a plurality of second weight data by processing the first feature data of the current optical flow by the optical flow decoder, wherein the obtaining of the first prediction image includes: obtaining a plurality of first prediction images from the previous reconstructed image, based on the plurality of current optical flows, and wherein the obtaining of the second prediction image includes: obtaining a plurality of modified prediction images by applying the plurality of second weight data to the plurality of first prediction images; obtaining a third prediction image by combining the plurality of modified prediction images; and obtaining the second prediction image by applying the first sample value of the first weight data to a third sample value of the third prediction image.

According to another aspect of the disclosure, there is provided an image encoding apparatus based on artificial intelligence (AI), the image encoding apparatus including: a prediction encoder configured to: obtain first feature data by applying a current image and a previous reconstructed image to an optical flow encoder, obtain a current optical flow and first weight data by applying the first feature data to an optical flow decoder, obtain a first prediction image from the previous reconstructed image, based on the current optical flow, obtain a second prediction image by applying a first sample value of the first weight data to a second sample value of the first prediction image, obtain a current residual image corresponding to a difference between the second prediction image and the current image, and obtain second feature data of the current residual image by applying the current residual image to a residual encoder; and a generator configured to generate a bitstream including the first feature data corresponding to the current optical flow and the second feature data corresponding to the current residual image.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
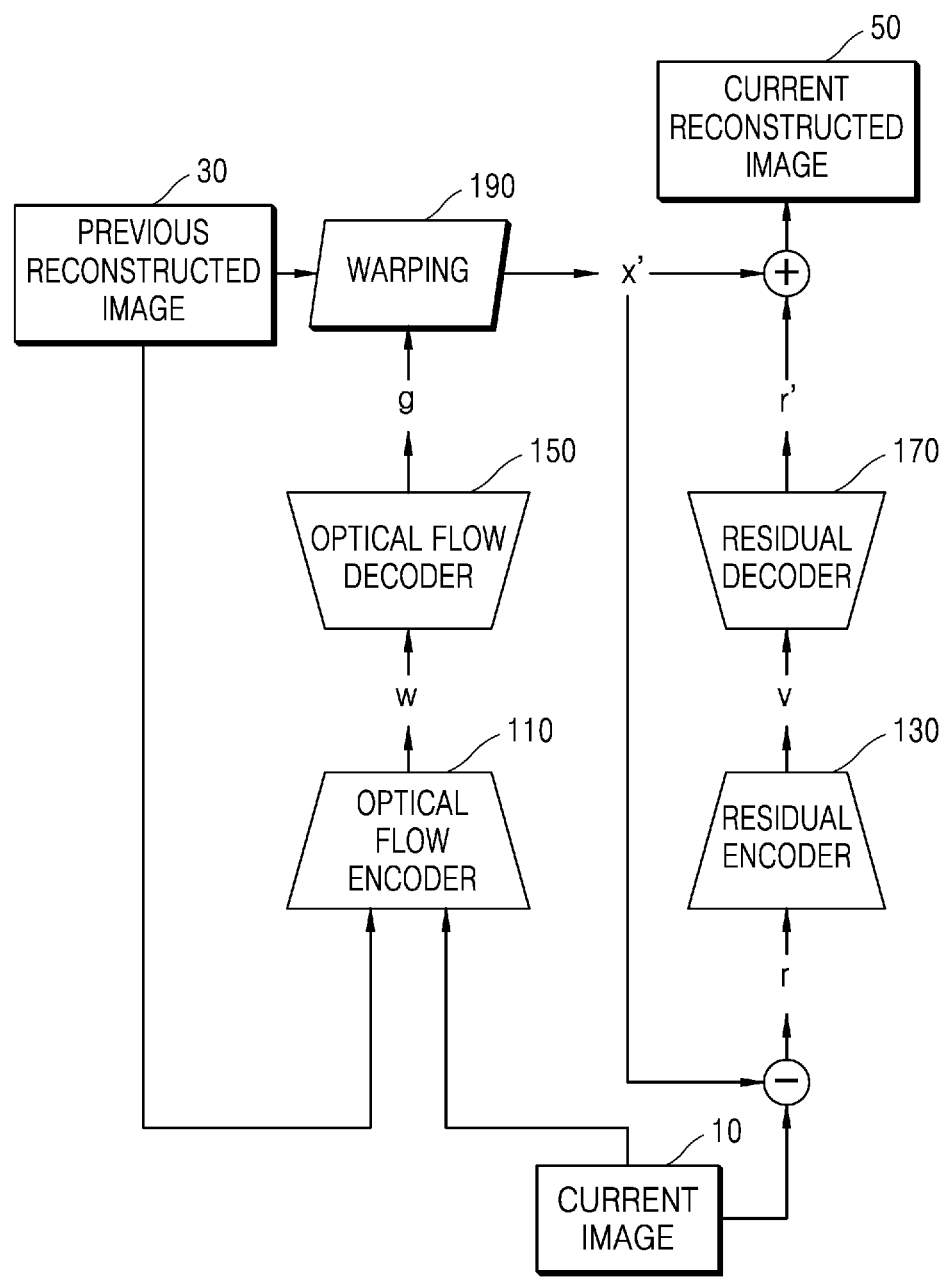
FIG. 1 is a diagram illustrating an image encoding and decoding process based on artificial intelligence (AI)

Embodiments of the disclosure are described in detail below, examples of which are shown in the accompanying drawings, in which identical or similar reference numerals denote identical or similar elements or elements having identical or similar functions throughout. The embodiments described below by reference to the accompanying drawings are exemplary and are intended only to explain the disclosure and are not to be construed as limiting the disclosure.

As the disclosure allows for various changes and numerous embodiments, particular embodiments will be illustrated in the drawings and described in detail in the written description. However, this is not intended to limit the disclosure to particular modes of practice, and all changes, equivalents, and substitutes that do not depart from the spirit and technical scope of the disclosure are encompassed in the disclosure.

In the description of embodiments of the disclosure, certain detailed explanations of the related art are omitted when it is deemed that they may unnecessarily obscure the essence of the disclosure. While such terms as "first," "second," etc., may be used to describe various components, such components must not be limited to the above terms. The above terms are used only to distinguish one component from another.

Throughout the disclosure, the expression "at least one of a, b or c" indicates only a, only b, only c, both a and b, both a and c, both b and c, or all of a, b, and c.

When an element (e.g., a first element) is "coupled to" or "connected to" another element (e.g., a second element), the first element may be directly coupled to or connected to the second element, or, unless otherwise described, a third element may exist therebetween.

Regarding a component represented as a "portion", "unit" or a "module" used herein, two or more components may be combined into one component or one component may be divided into two or more components according to subdivided functions. In addition, each component described hereinafter may additionally perform some or all of functions performed by another component, in addition to main functions of itself, and some of the main functions of each component may be performed entirely by another component.

An 'image' used herein may indicate a still image, a picture, a frame, a moving picture composed of a plurality of continuous still images, or a video.

A 'neural network' used herein is a representative example of an artificial neural network model that mimics a brain nerve, and is not limited to an artificial neural network model using a specific algorithm. The neural network may also be referred to as a deep neural network.

A 'parameter' used herein, which is a value used in a computation process of each layer included in a neural network, may be used, for example, when an input value is applied to a computation formula. The computation formula may be a predetermined formula. The parameter, which is a value set as a result of training, may be updated through separate training data according to need.

'Feature data' used herein may refer to data obtained by processing input data by a neural-network-based encoder. The feature data may be one- or two-dimensional (1D or 2D) data including a plurality of samples. The feature data may also be referred to as latent representation. The feature data may represent latent features of data output by a decoder described below.

A 'current image' used herein may refer to an image to be currently processed, and a 'previous image' used herein may refer to an image that is processed before the current image. A 'current optical flow' and a 'current residual image' may refer to an optical flow and a residual image both obtained to process the current image, respectively.

Throughout the disclosure, a 'sample' may be data assigned to a sampling location within an image, a feature map, or weight data, and may refer to data that is to be processed. For example, the sample may pixels in a 2D image.

FIG. 1 is a diagram illustrating an image encoding and decoding process based on artificial intelligence (AI).

FIG. 1 illustrates an inter prediction process, which may use an optical flow encoder 110, a residual encoder 130, an optical flow decoder 150, and a residual decoder 170.

The optical flow encoder 110, the residual encoder 130, the optical flow decoder 150, and the residual decoder 170 may be implemented as neural networks.

The optical flow encoder 110 and the optical flow decoder 150 may be understood as neural networks for extracting a current optical flow g from a current image 10 and a previous reconstructed image 30.

The residual encoder 130 and the residual decoder 170 may be understood as neural networks for encoding and decoding a residual image r.

As described above, inter prediction is a process of encoding and decoding the current image 10 by using temporal redundancy between the current image 10 and the previous reconstructed image 30. The previous reconstructed image 30 may be an image obtained by decoding a previous image processed before the current image 10 is processed.

According to an example embodiment, position differences between blocks or samples in the current image 10 and reference blocks or reference samples in the previous reconstructed image 30 are used to encode and decode the current image 10. For example, motion vectors indicating or representing a different between blocks or samples in the current image 10 and reference blocks or reference samples in the previous reconstructed image 30 are used to encode and decode the current image 10. The position differences or the motion vectors may be referred to as an optical flow. The optical flow may be defined as a set of motion vectors corresponding to samples or blocks in an image.

The current optical flow g may represent how the positions of samples in the previous reconstructed image 30 have been changed in the current image 10, or where samples that are the same as or similar to the samples of the current image 10 are located in the previous reconstructed image 30.

For example, when a sample that is the same as or the most similar to a sample located at (1, 1) in the current image 10 is located at (2, 1) in the previous reconstructed image 30, an optical flow or motion vector of the sample may be derived as (1, 0) by subtracting the location in the current image 10 from the location in the previous reconstructed image 30 (i.e., (1(=2−1), 0(=1−1))).

In the image encoding and decoding process using AI, the optical flow encoder 110 and the optical flow decoder 150 may be used to obtain the current optical flow g for the current image 10.

In detail, the previous reconstructed image 30 and the current image 10 may be input to the optical flow encoder 110. The optical flow encoder 110 may output feature data w of a current optical flow by processing the current image 10 and the previous reconstructed image 30 according to parameters set as a result of training.

The feature data w of the current optical flow may be input to the optical flow decoder 150. The optical flow decoder 150 may output the current optical flow g by processing the input feature data w according to the parameters set as a result of training.

The previous reconstructed image 30 may be warped via warping operation 190 based on the current optical flow g, and a current prediction image x' may be obtained as a result of the warping 190. The warping operation 190 may be a type of geometric transformation for changing positions of samples in an image.

The current prediction image x' similar to the current image 10 may be obtained by applying the warping 190 to the previous reconstructed image 30 according to the current optical flow g representing relative position relationships between the samples in the previous reconstructed image 30 and the samples in the current image 10.

For example, when a sample located at (1, 1) in the previous reconstructed image 30 is the most similar to a sample located at (2, 1) in the current image 10, the position of the sample located at (1, 1) in the previous reconstructed image 30 may be changed to (2, 1) through the warping 190.

Since the current prediction image x' generated from the previous reconstructed image 30 is not the current image 10 itself, a current residual image r between the current prediction image x' and the current image 10 may be obtained.

For example, the current residual image r may be obtained by subtracting sample values in the current prediction image x' from sample values in the current image 10.

The current residual image r may be input to the residual encoder 130. The residual encoder 130 may output feature data v of the current residual image r by processing the residual image according to the parameters set as a result of training.

The feature data v of the current residual image may be input to the residual decoder 170. The residual decoder 170 may output a reconstructed current residual image r' by processing the input feature data v according to the parameters set as a result of training.

The current prediction image x' may be combined with the reconstructed current residual image r', to obtain a current reconstructed image 50.

When the image encoding and decoding process shown in FIG. 1 is implemented by an encoding apparatus and a decoding apparatus, the encoding apparatus may obtain the feature data w of the current optical flow and the feature data v of the current residual image through the encoding of the current image 10. The encoding apparatus may apply transformation and/or quantization to the feature data w of the current optical flow and the feature data v of the current residual image, generate a bitstream including a result of the transformation and/or the quantization, and transmit the generated bitstream to the decoding apparatus. The decoding apparatus may obtain the feature data w of the current optical flow and the feature data v of the current residual image by applying inverse transformation and/or inverse quantization to data extracted from the bitstream. The decoding apparatus may obtain the current reconstructed image 50 by processing the feature data w of the current optical flow and the feature data v of the current residual image by using the optical flow decoder 150 and the residual decoder 170.

As described above, the current residual image r between the current image 10 and the current prediction image x' may be input to the residual encoder 130, and the feature data v of the current residual image may be obtained by the residual encoder 130. Because the feature data v of the current residual image is included in the bitstream after undergoing a predetermined process, reductions in the size of the feature data v of the current residual image and furthermore the magnitudes of the sample values of the current residual image r, are necessary to reduce the size of the bitstream. However, when the current optical flow g is inaccurate, a difference between the current image 10 and the current prediction image x' inevitably increases, and thus the inaccurate current optical flow g becomes a factor that increases the size of the bitstream.

The current optical flow g may be obtained inaccurately due to limitations of the processing abilities of the optical flow encoder 110 and the optical flow decoder 150, but, in some cases, the accuracy may be reduced due to movements of objects included in the previous reconstructed image 30 and the current image 10, and accordingly, the quality of the current prediction image x' may also be lowered.

A case in which a current optical flow g of low quality may be obtained will be described with reference to FIGS. 2 and 3.

Figure 2:
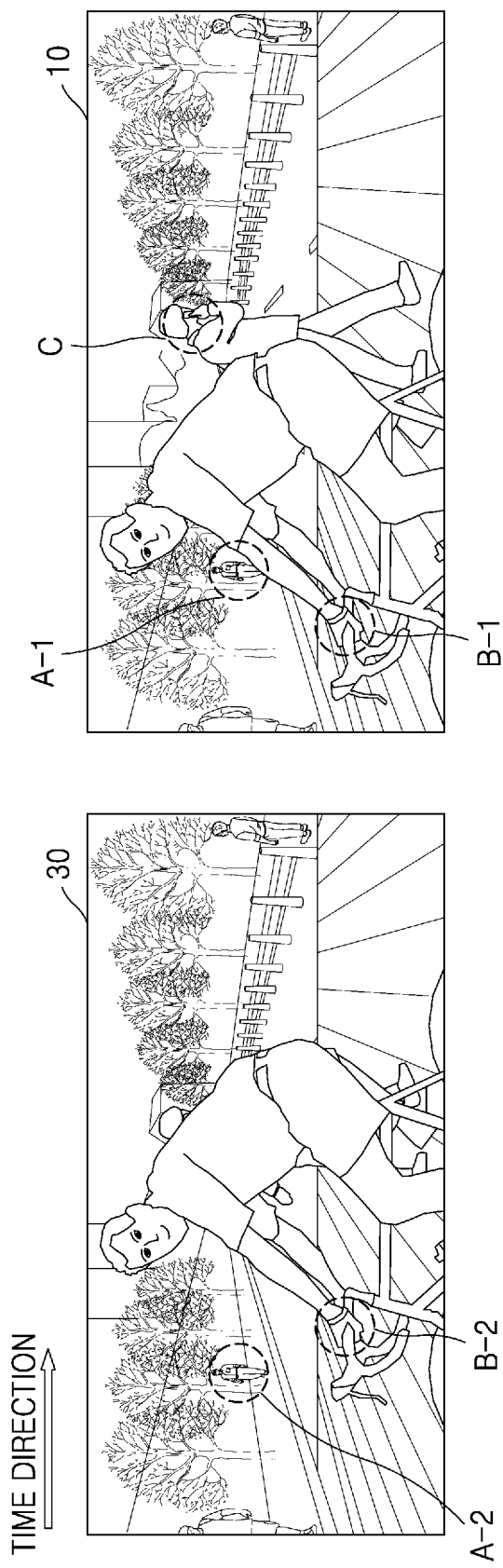
FIG. 2 is a view illustrating a previous reconstructed image and a current image.

FIG. 2 is a view illustrating an example of the previous reconstructed image 30 and the current image 10.

Movements of objects included in consecutive images may vary. An object may denote a sample within an image or a group of samples within the image.

The movement of one object included in the consecutive images may be large, and the movement of another object included in the consecutive images may be small. An object included in one image may not exist in a previous image or a next image.

The movement of a certain object being large may mean that a difference between locations of the certain object in consecutive images is large, and the movement of the certain object being small may mean that the difference between the locations of the certain object in the consecutive images is small.

Due to various movements of the objects included in images and occlusion of objects in the image, the current optical flow g obtained from the current image 10 and the previous reconstructed image 30 may become inaccurate.

Referring to FIG. 2, in a scenario, in which, a difference between a location of an object included in region A-1 in the current image 10 and a location of the same object included in region A-2 in the previous reconstructed image 30 is not large, the movement of the object may be considered small. For an object with a small movement, the current optical flow g may be measured relatively accurately, because, in order to obtain a motion vector of the object included in the region A-1 in the current image 10, only a region corresponding to the region A-1 and the periphery of the region has to be searched from the previous reconstructed image 30.

In another scenario, in which, a difference between a location of an object included in region B-1 in the current image 10 and a location of the same object included in region B-2 in the previous reconstructed image 30 is large, the movement of the object may be considered large. For an object with a large movement, the current optical flow g may be difficult to measure accurately, because, in order to obtain a motion vector of the object included in region B-1 in the current image 10, even when a region corresponding to the region B-1 and the periphery of the region are searched from the previous reconstructed image 30, it may be difficult to find the same object as the object included in the region B-1 (i.e., the object included in the region B-2).

In yet another scenario, an object included in region C in the current image 10 may not be included in the previous restored image 30. In other words, the object included in the region C may be occluded in the previous reconstructed image 30. In this case, it is difficult to find an object identical or similar to the object included in the region C in the current image 10 from the previous restored image 30.

In the case of an object having a small movement, a motion vector may be calculated relatively accurately, and thus encoding and/or decoding efficiency may be increased when inter prediction is applied to the object. Here, encoding and/or decoding efficiency being high means that the bitrate of the bitstream is decreased and the quality of a reconstructed object is increased.

On the other hand, in the case of an object having a large movement or an occluded object, a motion vector is difficult to calculate accurately, and thus encoding and/or decoding efficiency is decreased when inter prediction is applied to the object.

Moreover, in some cases, even when there is little movement of the objects included in the current image 10 or the objects included in the current image 10 are not occluded in the previous reconstructed image 30, it may be difficult to obtain accurate results by applying inter prediction. As such, according to some cases, it may not be efficient to apply inter prediction to the image.

Figure 3:
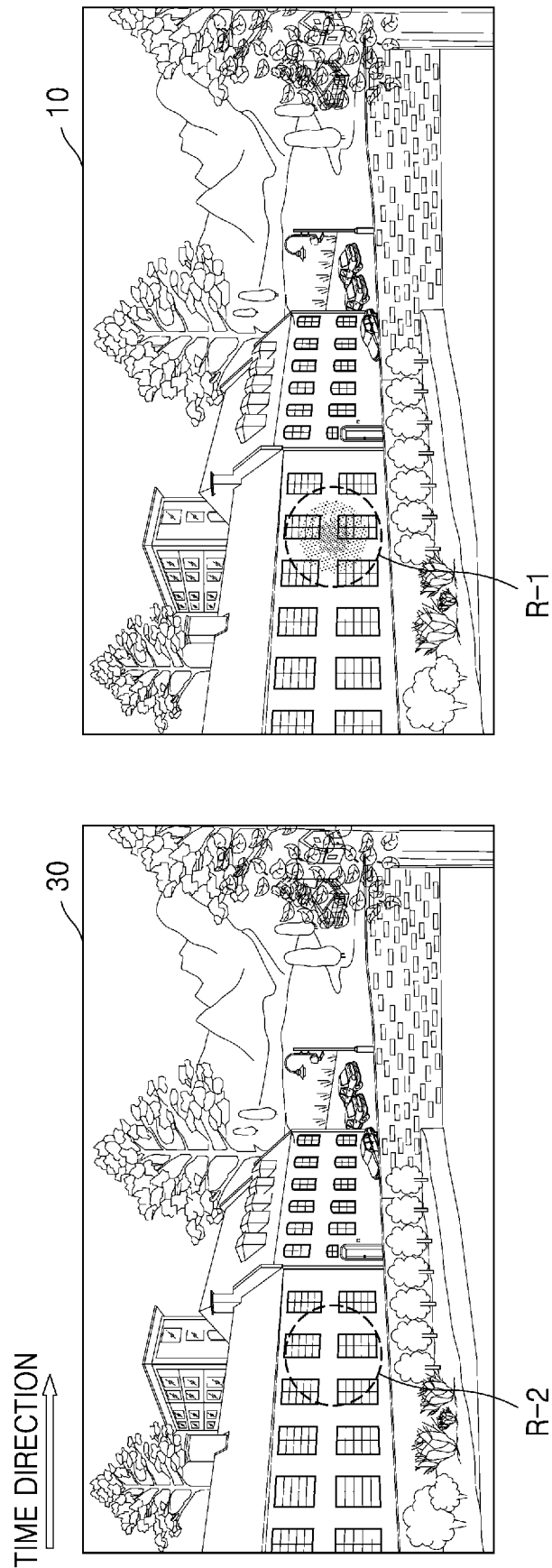
FIG. 3 is a view illustrating a previous reconstructed image and a current image.

For example, referring to FIG. 3, when a difference between the brightness of an object included in region R-1 and the brightness of the same object included in region R-2 in the previous reconstructed image 30 is large even when a difference between the location of the object included in the region R-1 and the location of the same object included in the region R-2, it may be difficult to obtain accurate results by applying inter prediction to the object.

As described above with reference to FIG. 1, the current residual image r corresponding to a difference between the current prediction image x' generated through the warping 190 on the previously reconstructed image 30 and the current image 10 may be input to the residual encoder 130. In this case, when a difference between the brightness value of a specific object in the current image 10 and the brightness value of the same object in the previous reconstructed image 30 is large, a difference between sample values in the current image 10 and sample values at the same location in the current prediction image x' generated from the previous reconstructed image 30 also increases, and as a result, sample values of the current residual image r increases. In other words, when a change in the brightness value of a specific object in consecutive images is large, it may be difficult to increase encoding and/or decoding efficiency, even when inter prediction is applied to the object.

As described above, when inter prediction is applied to a certain object included in consecutive images, encoding and/or decoding efficiency may be increased, and, when inter prediction is applied to a certain object, encoding and/or decoding efficiency may be reduced.

Accordingly, encoding and/or decoding efficiency may be improved by modifying the current prediction image x' according to the characteristics of an object and using a modified prediction image instead of using the current prediction image x' without changes.

Figure 4:
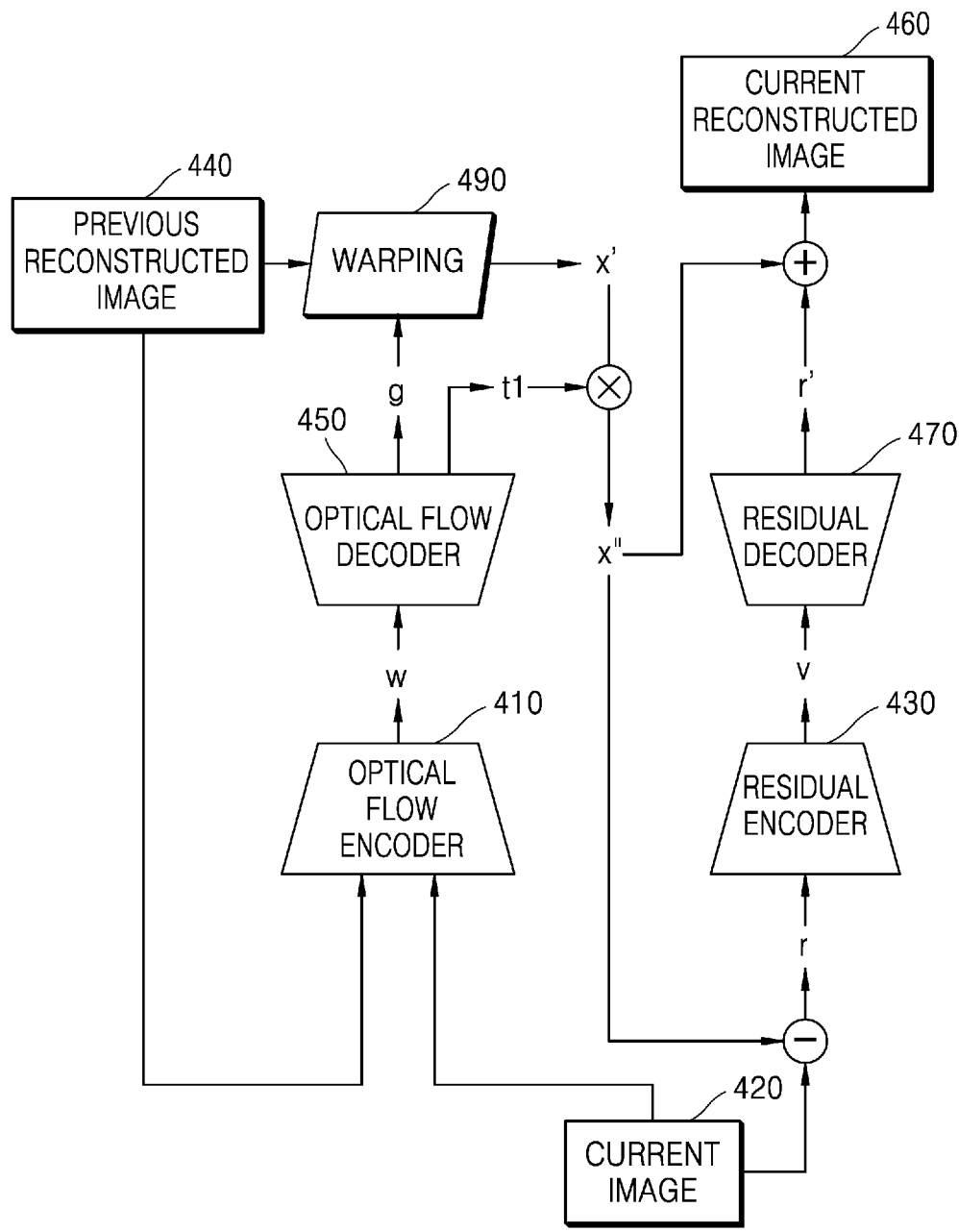
FIG. 4 is a diagram for describing an image encoding and decoding process according to an embodiment.

FIG. 4 is a diagram for describing an image encoding and decoding process according to an embodiment.

Referring to FIG. 4, an optical flow encoder 410, an optical flow decoder 450, a residual encoder 430, and a residual decoder 470 may be used to encode and decode an image.

According to an embodiment, the optical flow encoder 410, the optical flow decoder 450, the residual encoder 430, and the residual decoder 470 may be implemented as neural networks.

According to an example embodiment, a current image 420 may be encoded by inputting a previous reconstructed image 440 and the current image 420 to the optical flow encoder 410. The optical flow encoder 410 may receive the current image 420 and the previous reconstructed image 440 as input, and may output feature data w of a current optical flow by processing the current image 420 and the previous reconstructed image 440 according to parameters set as a result of training. For example, the optical flow encoder 410 may output feature data w corresponding to the current optical flow.

The feature data w of the current optical flow may be input to the optical flow decoder 450.

The optical flow decoder 450 may output a current optical flow g by processing the input feature data w according to the parameters set as a result of training. For example, the feature data corresponding to the current optical flow may be used by the optical flow decoder 450 to obtain the current optical flow.

According to an example embodiment, the optical flow decoder 450 may also output first weight data t1. For example, the optical flow decoder 450 may output first weight data t1 separately from the current optical flow g. The first weight data t1 is used to modify a preliminary prediction image x' generated through warping 490.

The previous reconstructed image 440 may be warped via the warping 490 based on the current optical flow g, and the preliminary prediction image x' may be obtained as a result of the warping 490.

A final prediction image x" may be obtained by applying the first weight data t1 to the preliminary prediction image x'.

As will be described later with reference to FIGS. 25 and 26, because the optical flow decoder 450 may be trained to reduce the bitrate of a bitstream including feature data v of a current residual image or the sample values of a current residual image r, the first weight data t1, which reduces a difference between the current image 420 and the preliminary prediction image x', may be output by the optical flow decoder 450.

The current residual image r corresponding to a difference between a final prediction image x" and the current image 420 may be input to the residual encoder 430.

The residual encoder 430 may output the feature data v of the current residual image by processing the current residual image r according to the parameters set as a result of training. For example, the residual encoder 430 may output feature data v corresponding to the current residual image.

The feature data v of the current residual image may be input to the residual decoder 470. The residual decoder 470 may obtain a reconstructed current residual image r' by processing the feature data v according to the parameters set as a result of training.

A current reconstructed image 460 may be obtained by combining the reconstructed current residual image r' with the final prediction image x".

When the image encoding and decoding process shown in FIG. 4 is implemented by an encoding apparatus and a decoding apparatus, the encoding apparatus may obtain the feature data w of the current optical flow and the feature data v of the current residual image through the encoding of the current image 420. The encoding apparatus may generate a bitstream including the feature data w of the current optical flow and the feature data v of the current residual image, and may transmit the generated bitstream to the decoding apparatus.

The decoding apparatus may obtain the feature data w of the current optical flow and the feature data v of the current residual image from the bitstream. The decoding apparatus may obtain the current reconstructed image 460, based on the feature data w of the current optical flow and the feature data v of the current residual image.

The image encoding and decoding process shown in FIG. 4 is different from the process shown in FIG. 1 in that the preliminary prediction image x' generated through the warping 490 is modified according to the first weight data t1.

In other words, the final prediction image x" may be similar to the current image 420 by processing the preliminary prediction image x', based on the first weight data t1, and thus encoding and/or decoding efficiency may be improved.

In detail, the first weight data t1 including a small sample value may be output for an object having a large movement or an occluded object, so that the sample value of the preliminary prediction image x' may be changed to be small, and the first weight data t1 including a sample value close to 1 may be output for an object having small or no movement, so that the sample value of the preliminary prediction image x' may be hardly changed.

In other words, as a result of inter prediction according to the sample values included in the first weight data t1, for example, an influence of the sample values of the preliminary prediction image x' on the sample values of the final prediction image x" may vary according to the sample values included in the first weight data t1.

For example, a sample value of 0 included in the first weight data t1 may mean that a sample value of the preliminary prediction image x' has no effect on a sample value of the final prediction image x". This may be understood as inter prediction being not applied to the sample value of the final prediction image x". In this case, the previous reconstructed image 440 is not used to obtain a sample of the current reconstructed image 460, and as such, intra prediction is applied to obtain the current reconstructed image 460.

According to an embodiment, a sample value included in the first weight data t1 is set to be greater than 1 or less than 1 for an object in the previous reconstructed image 440 having a large change in brightness value compared to the current image 420, so that the sample value of the preliminary prediction image x' may become more similar to the sample value in the current image 420.

The number of samples included in the current optical flow g may be the same as the number of samples included in the current image 420. For example, the number of samples included in the current optical flow g may be the same as the number of objects identified or included in the current image 420. This may denote that one motion vector is extracted for each of the samples included in the current image 420. However, because a plurality of samples that are identical or similar to the samples included in the current image 420 may exist in the previous reconstructed image 440, when two or more motion vectors are extracted for each of the samples of the current image 420, the efficiency of inter prediction efficiency may be improved. This will be described in detail with reference to FIG. 5.

Figure 5:
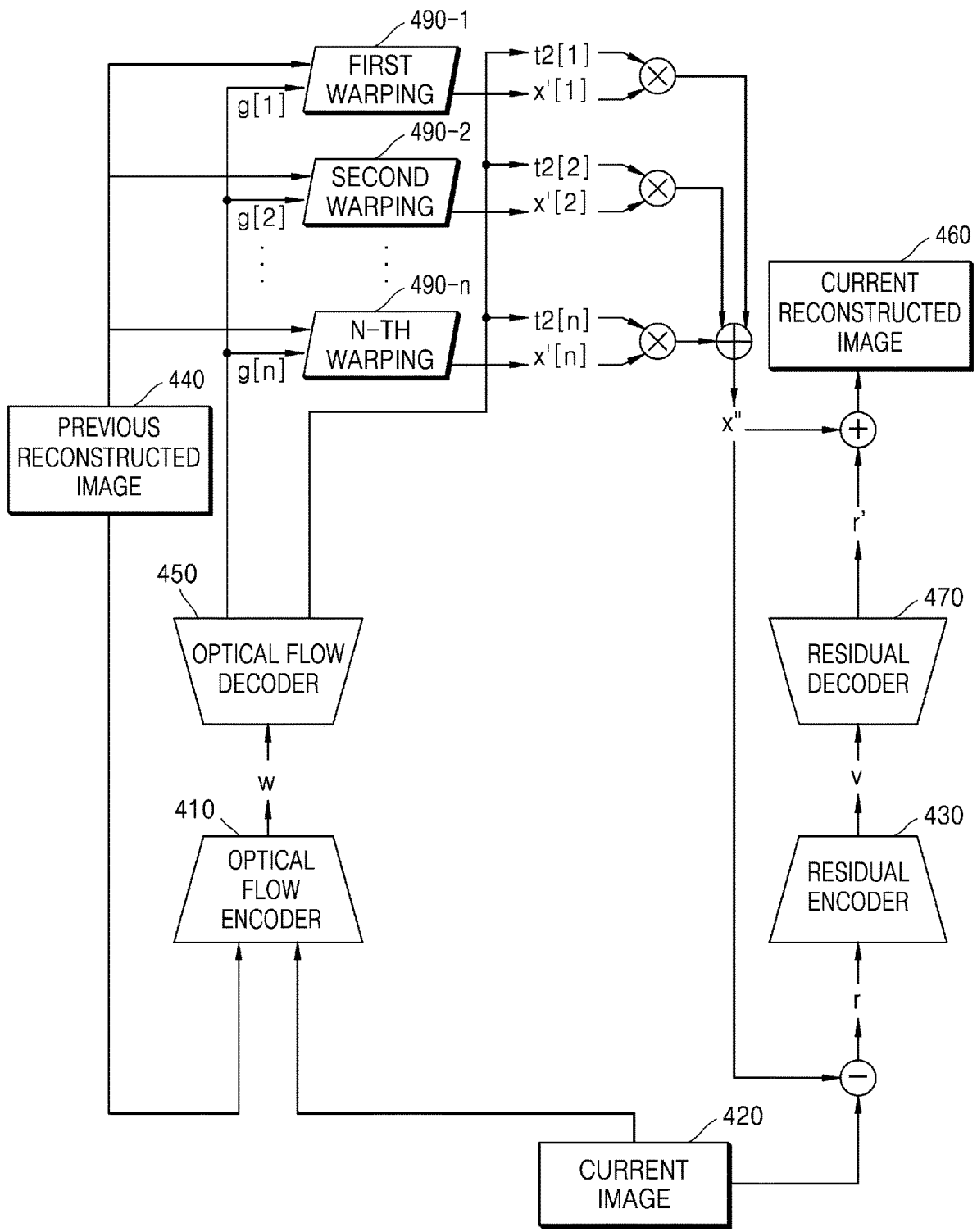
FIG. 5 is a diagram for describing an image encoding and decoding process according to an embodiment.

Referring to FIG. 5, the optical flow encoder 410, the optical flow decoder 450, the residual encoder 430, and the residual decoder 470 may be used to encode and decode an image.

According to an embodiment, the optical flow encoder 410, the optical flow decoder 450, the residual encoder 430, and the residual decoder 470 may be implemented as neural networks.

To encode the current image 420, the previous reconstructed image 440 and the current image 420 may be input to the optical flow encoder 410.

The optical flow encoder 410 may output feature data w of a current optical flow by processing the current image 420 and the previous reconstructed image 440 according to parameters set as a result of training.

The feature data w of the current optical flow may be input to the optical flow decoder 450.

The optical flow decoder 450 may output a plurality of current optical flows g[i] (where i is an index indicating an integer equal to or greater than 0) by processing the input feature data w according to the parameters set as a result of training.

The optical flow decoder 450 may output a plurality of second weight data t2[i] separately from the plurality of current optical flows g[i]. The plurality of second weight data t2[i] may be used to modify a plurality of preliminary prediction images x'[i] generated through warping 490-1, 490-2, ..., and 490-n.

The plurality of second weight data t2[i] may be referred to as reliability or accuracy of the plurality of current optical flows g[i].

The number of samples included in each of the plurality of second weight data t2[i] may be the same as the number of samples included in each of the plurality of current optical flows g[i]. In this case, sample values included in the plurality of second weight data t2[i] may indicate reliability or accuracy of sample values included in the plurality of current optical flows g[i]. For example, sample values located at predetermined positions in the plurality of second weight data t2[i] may indicate reliability or accuracy of sample values located at predetermined positions in the plurality of current optical flows g[i]. As will be described later, by setting a sum of sample values at the same position in the plurality of second weight data t2[i] to be 1, the sample values of the previous reconstructed image 440 may be maintained without changes even in the final prediction image x".

The previous reconstructed image 440 may be warped via the warping 490-1, 490-2, ..., and 490-n based on the plurality of current optical flows g[i], and the plurality of preliminary prediction images x'[i] may be obtained as a result of the warping 490-1, 490-2, ..., and 490-n.

The plurality of second weight data t2[i] may be applied to the plurality of preliminary prediction images x'[i], and the final prediction image x" may be obtained by combining the plurality of preliminary prediction images x'[i] to which the plurality of second weight data t2[i] have been applied with one another.

Because the optical flow decoder 450 may be trained to reduce the bitrate of a bitstream including the feature data v of the current residual image or the sample values of the current residual image r, the plurality of second weight data t2[i] that reduce a difference between the current image 420 and the final prediction image x" may be output by the optical flow decoder 450.

The current residual image r corresponding to a difference between the final prediction image x" and the current image 420 may be input to the residual encoder 430.

The residual encoder 430 may output the feature data v of the current residual image by processing the current residual image r according to the parameters set as a result of training.

The feature data v of the current residual image may be input to the residual decoder 470. The residual decoder 470 may obtain the reconstructed current residual image r' by processing the feature data v according to the parameters set as a result of training.

A current reconstructed image 460 may be obtained by combining the reconstructed current residual image r' with the final prediction image x".

When the image encoding and decoding process shown in FIG. 5 is implemented by an encoding apparatus and a decoding apparatus, the encoding apparatus may generate a bitstream including the feature data w of the current optical flow and the feature data v of the current residual image both obtained through the encoding of the current image 420, and may transmit the generated bitstream to the decoding apparatus.

The decoding apparatus may obtain the feature data w of the current optical flow and the feature data v of the current residual image from the bitstream. The decoding apparatus may obtain the current reconstructed image 460, based on the feature data w of the current optical flow and the feature data v of the current residual image.

The image encoding and decoding process shown in FIG. 5 is different from the process shown in FIGS. 1 and 4 in that the optical flow decoder 450 outputs the plurality of current optical flows g[i] and the plurality of second weight data t2[$i$].

In other words, a plurality of preliminary prediction images capable of serving as a prediction version of the current image 420 are obtained based on the plurality of current optical flows g[i], and the plurality of second weight data t2[$i$] indicating reliability or accuracy of each of the samples of the plurality of current optical flows g[i] to a plurality of preliminary prediction images, whereby encoding and/or decoding efficiency may be improved.

An image decoding apparatus 600, an image encoding apparatus 1600, and image decoding/encoding methods performed thereby, according to an embodiment, will now be described with reference to FIGS. 6 through 22.

Figure 6:
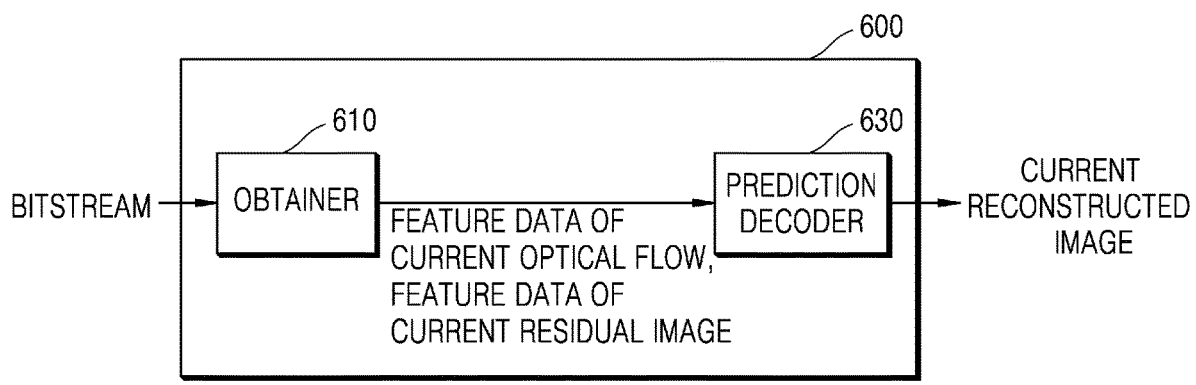
FIG. 6 is a block diagram of a structure of an image decoding apparatus according to an embodiment.

FIG. 6 is a block diagram of a structure of the image decoding apparatus 600 according to an embodiment.

Referring to FIG. 6, the image decoding apparatus 600 according to an embodiment may include an obtainer 610 and a prediction decoder 630.

The obtainer 610 and the prediction decoder 630 may be implemented as one or more processors. The obtainer 610 and the prediction decoder 630 may operate according to one or more instructions stored in a memory. For example, the memory may store one or more instructions, or program code. According to an example embodiment, the one or more processors may execute the one or more instructions stored in the memory to implement the obtainer 610 and the prediction decoder 630 of the decoding apparatus 600.

Although the obtainer 610 and the prediction decoder 630 are individually illustrated in FIG. 6, the obtainer 610 and the prediction decoder 630 may be implemented through one processor. In this case, the obtainer 610 and the prediction decoder 630 may be implemented as a dedicated processor, or may be implemented through a combination of software and a general-purpose processor such as an application processor (AP), a central processing unit (CPU), or a graphics processing unit (GPU). The dedicated processor may include a memory for implementing an embodiment of the disclosure or a memory processing unit for using an external memory.

The obtainer 610 and the prediction decoder 630 may be configured by a plurality of processors. In this case, the obtainer 610 and the prediction decoder 630 may be implemented as a combination of dedicated processors, or may be implemented through a combination of software and a plurality of general-purpose processors such as APs, CPUs, or GPUs.

The obtainer 610 may obtain a bitstream including a result of encoding a current image.

The obtainer 610 may receive a bitstream from an image encoding apparatus through a network. According to an embodiment, the obtainer 610 may obtain the bitstream from a data storage medium including a magnetic medium (such as, a hard disk, a floppy disk, or a magnetic tape), an optical recording medium (such as, CD-ROM or DVD), or a magneto-optical medium (such as, a floptical disk).

The obtainer 610 may obtain feature data of a current optical flow and feature data of a current residual image by parsing the bitstream.

According to an embodiment, the obtainer 610 may obtain a first bitstream corresponding to the feature data of the current optical flow and a second bitstream corresponding to the feature data of the current residual image, and may obtain the feature data of the current optical flow by parsing the first bitstream, and may obtain the feature data of the current residual image by parsing the and the second bitstream.

The feature data of the current optical flow and the feature data of the current residual image may be transmitted to the prediction decoder 630, and the prediction decoder 630 may obtain a current reconstructed image corresponding to the current image by using the feature data of the current optical flow and the feature data of the current residual image. The current reconstructed image may be output to a display device to be reproduced.

Figure 7:
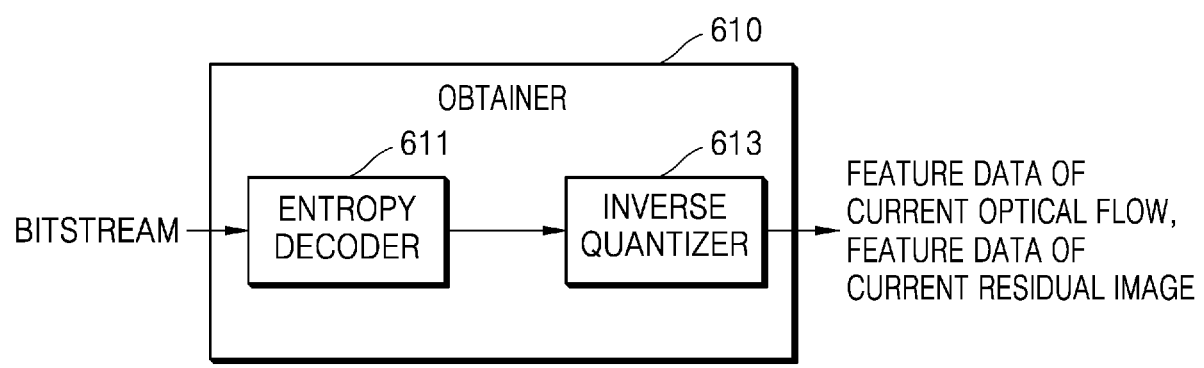
FIG. 7 is a block diagram of a configuration of an obtainer according to an embodiment.

FIG. 7 is a block diagram of a configuration of the obtainer 610.

Referring to FIG. 7, the obtainer 610 may include an entropy decoder 611 and an inverse quantizer 613.

The entropy decoder 611 may obtain quantized feature data of the current optical flow and quantized feature data of the current residual image by entropy-coding the bins included in the bitstream.

The inverse quantizer 613 may obtain the feature data of the current optical flow by inversely quantizing the quantized feature data of the current optical flow, and may obtain the feature data of the current residual image by inversely quantizing the quantized feature data of the current residual image.

According to an embodiment, the obtainer 610 may further include an inverse transformer. The inverse transformer may inversely transform the feature data output by the inverse quantizer 613, from a frequency domain into a spatial domain. When the image encoding apparatus 1600, which will be described below with reference to FIG. 16, transforms the feature data of the current optical flow and the feature data of the current residual image from a spatial domain into a frequency domain, the inverse transformer may inversely transform the feature data of the current optical flow and the feature data of the current residual image both output by the inverse quantizer 613 from the frequency domain into the spatial domain.

According to an embodiment, the obtainer 610 may not include the inverse quantizer 613. In other words, the feature data of the current optical flow and the feature data of the current residual image may be obtained through processing by the entropy decoder 611.

According to an embodiment, the obtainer 610 may obtain the feature data of the current optical flow and the feature data of the current residual image only by inversely binarizing the bins included in the bitstream. This may be performed for a case in which the image encoding apparatus 1600 generates the bitstream by binarizing the feature data of the current optical flow and the feature data of the current residual image, namely, a case in which the image encoding apparatus 1600 does not apply entropy encoding, transformation, and quantization to the feature data of the current optical flow and the feature data of the current residual image. However, the disclosure is not limited thereto, and as such, the feature data of the current optical flow and the feature data of the current residual image may be obtained in a different manner.

Figure 8:
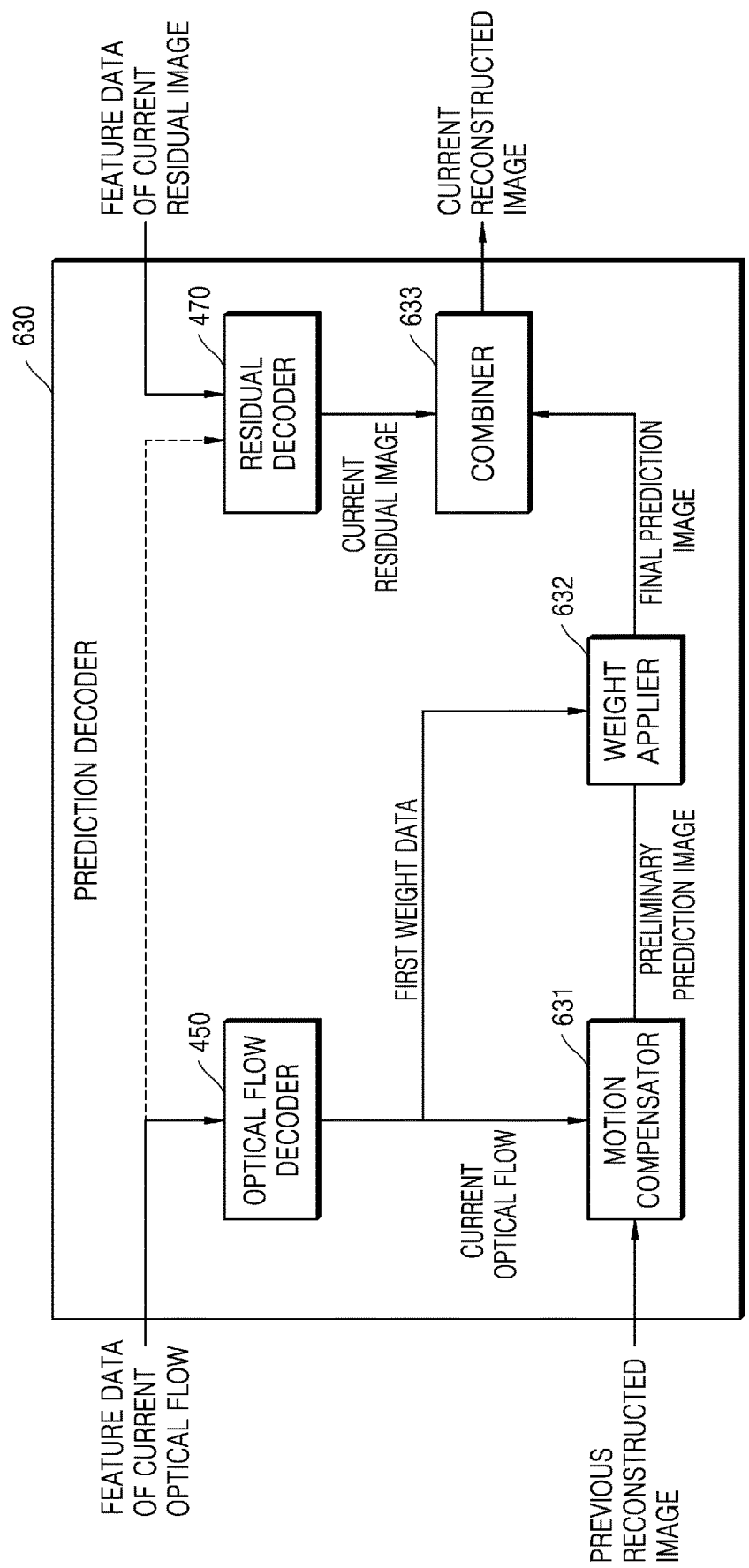
FIG. 8 is a block diagram of a configuration of a prediction decoder according to an embodiment.

FIG. 8 is a block diagram of a configuration of the prediction decoder 630 according to an embodiment.

Referring to FIG. 8, the prediction decoder 630 may include an optical flow decoder 450, a residual decoder 470, a motion compensator 631, a weight applier 632, and a combiner 633.

The optical flow decoder 450 and the residual decoder 470 may be implemented as neural networks including one or more layers. For example, the one or more layers may be a convolutional layer.

According to an example embodiment, the optical flow decoder 450 and the residual decoder 470 may be stored in a memory, and implemented by one or more processors. According to another embodiment, the optical flow decoder 450 and the residual decoder 470 may be implemented as one or more dedicated processors for AI.

The feature data of the current optical flow and the feature data of the current residual image both output by the obtainer 610 may be input to the optical flow decoder 450 and the residual decoder 470, respectively. For example, the feature data of the current optical flow may be input to the optical flow decoder 450 and the feature data of the current residual image may be input to the residual decoder 470.

The optical flow decoder 450 may output the current optical flow and first weight data by processing the feature data of the current optical flow according to the parameters set through training.

The current optical flow and the first weight data may include a plurality of samples. The current optical flow and the first weight data may be 1D or 2D data. The size of the current optical flow may be the same as the size of the first weight data. Here, the size of the current optical flow being the same as the size of the first weight data may mean that the number of samples included in the current optical flow is the same as the number of samples included in the first weight data.

According to an embodiment, the size of the current optical flow and the size of the first weight data may be the same as the size of a previous reconstructed image.

The current optical flow may be provided to the motion compensator 631. The motion compensator 631 may generate a preliminary prediction image by processing the previous reconstructed image according to the current optical flow.

The motion compensator 631 may warp the previous reconstructed image according to the current optical flow to generate the preliminary prediction image. The warping of the previous reconstructed image according to the current optical flow for generating the preliminary prediction image is merely an example, and as such, according to another embodiment, the motion compensator 631 may perform various types of image processing for changing the previous reconstructed image, based on the current optical flow, in order to generate the preliminary prediction image.

The preliminary prediction image generated by the motion compensator 631 and the first weight data output by the optical flow decoder 450 may be provided to the weight applier 632.

The weight applier 632 may obtain a final prediction image by applying the sample values of the first weight data to the sample values of the preliminary prediction image.

According to an embodiment, the weight applier 632 may obtain the final prediction image by multiplying the sample values of the preliminary prediction image by the sample values of the first weight data. In this case, the weight applier 632 may be referred to as a multiplier.

According to an example embodiment, the first weight data may include a first sample value and a second sample value. According to an example embodiment, when the preliminary prediction image includes a first sample value located at the same position as the first sample value of the first weight data and a second sample value located at the same position as the second sample value of the first weight data, a first sample value of the final prediction image may be obtained by multiplying the first sample value of the preliminary prediction image by the first sample value of the first weight data, and a second sample value of the final prediction image may be obtained by multiplying the second sample value of the preliminary prediction image by the second sample value of the first weight data.

The first weight data may include weights for making the sample values of the final prediction image as similar to the sample values of the current image as possible. As will be described later with reference to FIGS. 25 and 26, the optical flow decoder 450 may be trained in a direction that decreases or minimizes the sample values of the current residual image corresponding to a difference between the current image and the final prediction image. Accordingly, the optical flow decoder 450 may output the first weight data for reducing the difference between the current image and the final predicted image.

According to an embodiment, the smaller a difference between a sample value in the preliminary prediction image and a sample value located at the same position in the current image is, the closer a sample value in the first weight data may be to 1. In this case, it may be understood that the application rate of inter prediction with respect to the sample is increased.

According to an embodiment, when the sample value in the preliminary prediction image is greater than the sample value located at the same position in the current image, the sample value in the first weight data may be less than 1. According to an embodiment, when the sample value in the preliminary prediction image is less than the sample value located at the same position in the current image, the sample value in the first weight data may be greater than 1.

The first weight data may be for compensating for various movements and brightness changes of objects included in the current image and the previous reconstructed image.

As described above, when a movement of an object included in the current image and the previous reconstructed image is large, a sample value of the current optical flow may be inaccurate. In this case, when the sample value of the preliminary prediction image is not changed, a sample value of the current residual image is highly likely to increase.

When the movement of a first object included in the current image and the previous reconstructed image is large, the optical flow decoder 450 may output first weight data that decreases the rate of applying inter prediction to the object. As a sample value included in the first weight data decreases, the inter prediction application rate may also decrease. As the sample value included in the first weight data is 0, the inter prediction application rate may be 0%. According to an example embodiment, the first object may be a predetermined object.

When the first object included in the current image and the previous reconstructed image moves a little or does not move, the optical flow decoder 450 may output first weight data that increases the rate of applying inter prediction to the object. As the sample value included in the first weight data is close to 1, the inter prediction application rate may increase.

When there is a brightness change in the first object included in the current image and the previous reconstructed image, the optical flow decoder 450 may output first weight data capable of compensating for the brightness change. For example, when the brightness of the first object included in the previous reconstructed image is increased in the current image, the sample value in the first weight data may be greater than 1. On the other hand, when the brightness of the first object included in the previous reconstructed image is decreased in the current image, the sample value in the first weight data may be less than 1. Although a brightness change is illustrated according to an example embodiment, the disclosure is not limited thereto, and as such, other kinds of changes between an object included in the current image and the previous reconstructed image may also be taken into consideration in determining and/or applying the weight data.

According to an embodiment, because adjustment of the inter prediction application rate and compensation for the brightness change may be performed for each sample of the preliminary prediction image through the first weight data, sample values of the current residual image may be minimized and, accordingly, the bitrate of the bitstream may also be reduced.

The final prediction image generated by the weight applier 632 may be provided to the combiner 633.

The feature data of the current residual image output by the obtainer 610 may be input to the residual decoder 470.

According to an embodiment, the feature data of the current optical flow may be concatenated with the feature data of the current residual image, and a result of the concatenation may be input to the residual decoder 470. The concatenation may refer to a process of combining two or more pieces of feature data in a channel direction.

The residual decoder 470 may obtain the current residual image by processing the feature data of the current residual image according to the parameters set through training. The current residual image may be provided to the combiner 633.

The combiner 633 may obtain a current reconstructed image by combining the final prediction image with the current residual image.

According to an embodiment, the combiner 633 may obtain the current reconstructed image by adding sample values of the final prediction image and sample values of the current residual image. In this case, the combiner 633 may be referred to as an adder.

Figure 9:
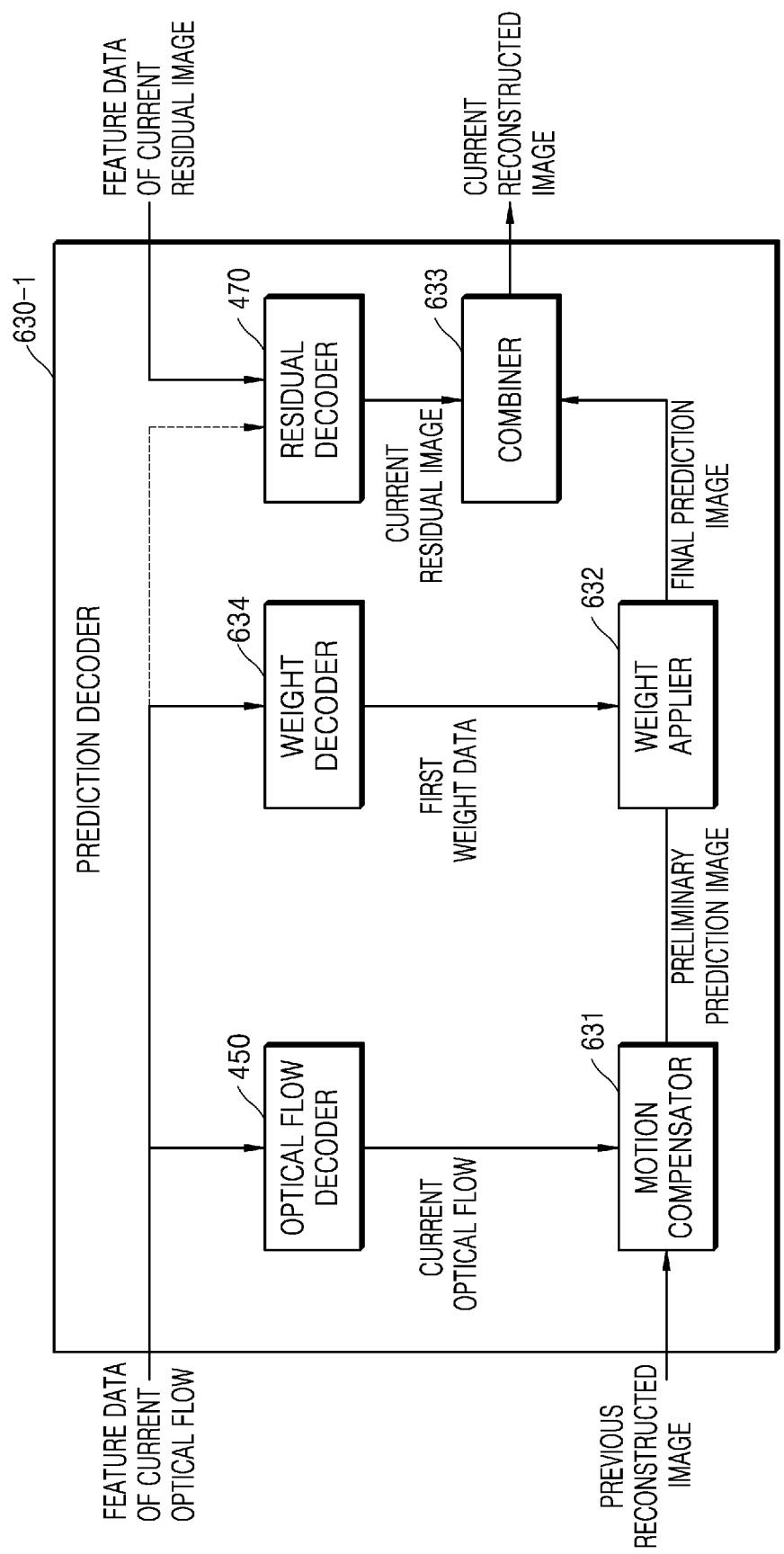
FIG. 9 is a block diagram of a configuration of a prediction decoder according to another embodiment.

FIG. 9 is a block diagram of a configuration of a prediction decoder 630-1 according to another embodiment.

The prediction decoder 630-1 shown in FIG. 9 may be the same as the prediction decoder 630 shown in FIG. 8, except that first weight data is output by a weight decoder 634.

In detail, the weight decoder 634 may be implemented as a neural network including one or more layers. For example, the one or more layers may be a convolutional layer.

The weight decoder 634 may be stored in a memory. According to an embodiment, the weight decoder 634 may be implemented as at least one dedicated processor for AI.

The feature data of the current optical flow output by the obtainer 610 may be input to the optical flow decoder 450 and the weight decoder 634.

The optical flow decoder 450 may output the current optical flow by processing the feature data of the current optical flow according to the parameters set through training.

The weight decoder 634 may output the first weight data by processing the feature data of the current optical flow according to the parameters set through training.

Similar to the optical flow decoder 450 of FIG. 8, the weight decoder 634 of FIG. 9 may be trained in a direction that decreases or minimizes the sample values of the current residual image corresponding to a difference between the current image and the final prediction image. Accordingly, the weight decoder 634 may output the first weight data for reducing the difference between the current image and the final prediction image.

According to an embodiment, the smaller a difference between a sample value in the preliminary prediction image and a sample value located at the same position in the current image is, the closer a sample value in the first weight data may be to 1. In this case, it may be understood that the application rate of inter prediction with respect to the sample is increased.

According to an embodiment, when the sample value in the preliminary prediction image is greater than the sample value located at the same position in the current image, the sample value in the first weight data may be less than 1. According to an embodiment, when the sample value in the preliminary prediction image is less than the sample value located at the same position in the current image, the sample value in the first weight data may be greater than 1.

The first weight data may be understood for compensating for various movements and brightness changes of objects included in the current image and the previous reconstructed image.

Figure 10:
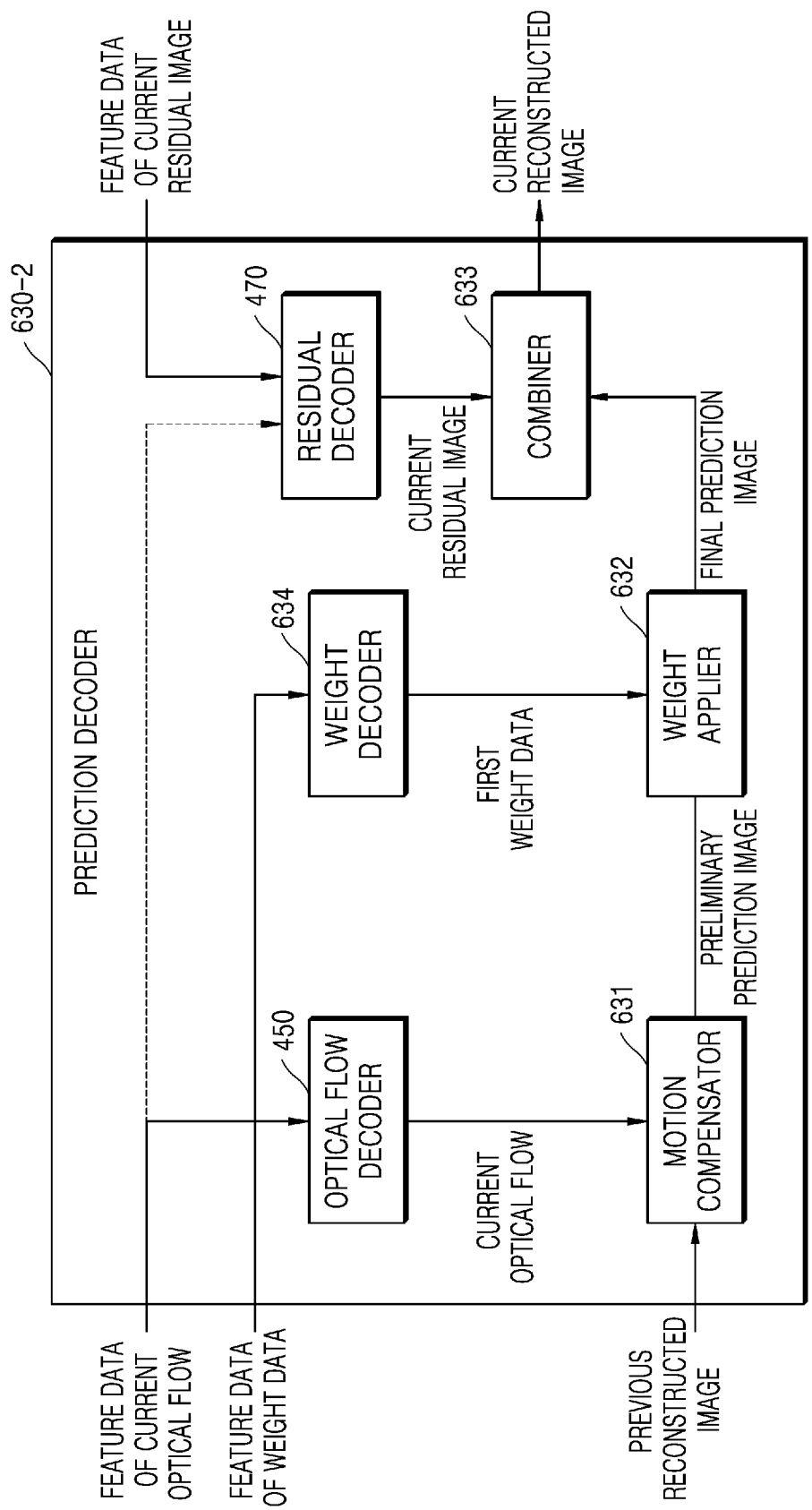
FIG. 10 is a block diagram of a configuration of a prediction decoder according to another embodiment.

FIG. 10 is a block diagram of a configuration of a prediction decoder 630-2 according to another example embodiment.

The prediction decoder 630-2 shown in FIG. 10 is the same as the prediction decoder 630-1 of FIG. 9 except that the weight decoder 634 processes feature data of weight data to output first weight data.

The feature data of the weight data may be generated by the image encoding apparatus 1600 and included in the bitstream. The obtainer 610 may obtain the feature data of the weight data from the bitstream and provide the obtained feature data to the weight decoder 634. According to an example embodiment, the feature data of the weight data may be separately input to the prediction decoder 630-2.

Other components of the prediction decoder 630-2 have been described above with reference to FIGS. 8 and 9, and thus detailed descriptions thereof will be omitted.

Figure 11:
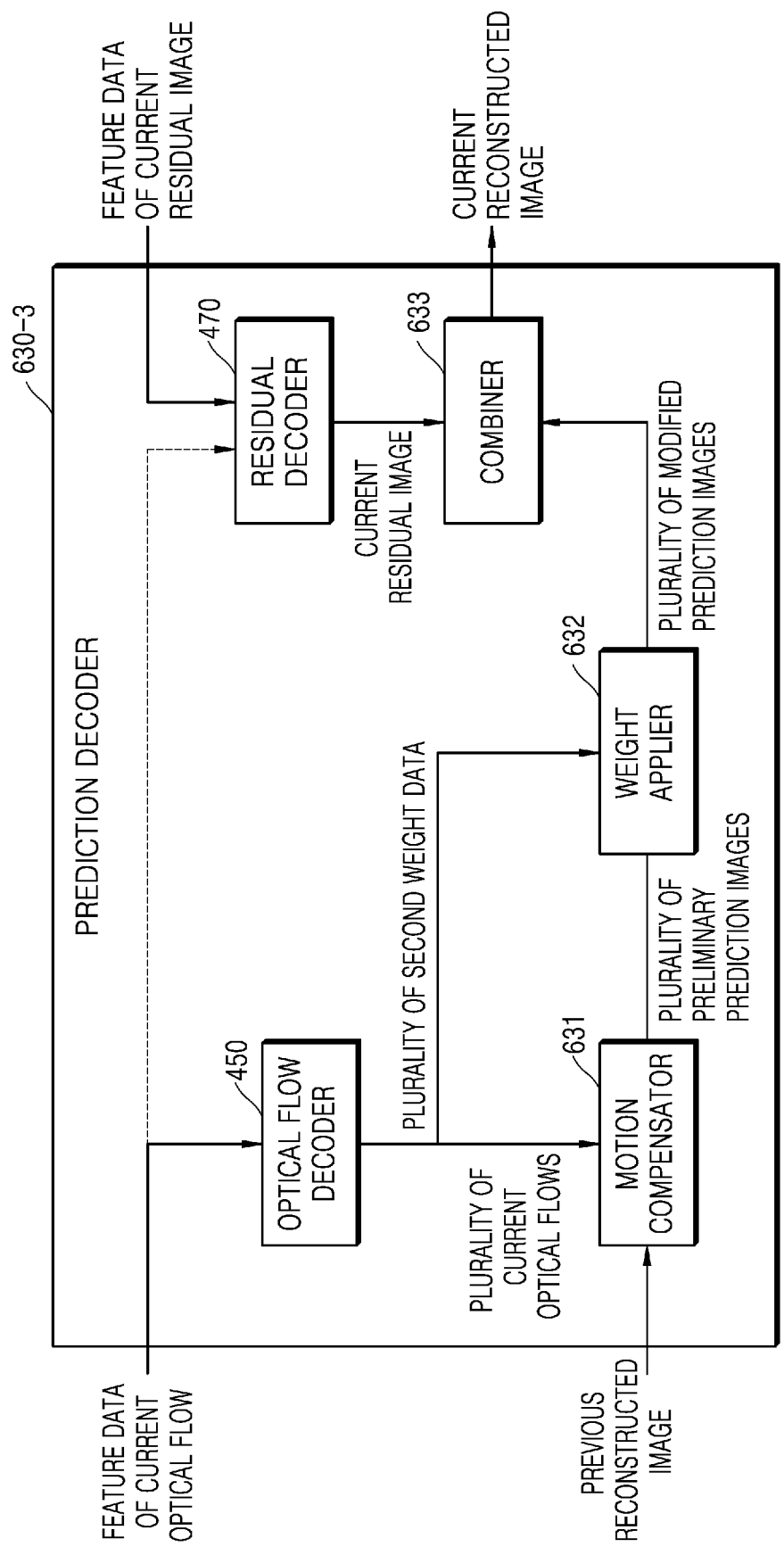
FIG. 11 is a block diagram of a configuration of a prediction decoder according to another embodiment.

FIG. 11 is a block diagram of a configuration of a prediction decoder 630-3 according to another embodiment.

The prediction decoder 630 of FIG. 11 may include the optical flow decoder 450, the residual decoder 470, the motion compensator 631, the weight applier 632, and the combiner 633.

The optical flow decoder 450 and the residual decoder 470 may be implemented as neural networks including one or more layers (e.g., a convolutional layer).

The optical flow decoder 450 and the residual decoder 470 may be stored in a memory. According to an embodiment, the optical flow decoder 450 and the residual decoder 470 may be implemented as one or more dedicated processors for AI.

The feature data of the current optical flow and the feature data of the current residual image both output by the obtainer 610 may be input to the optical flow decoder 450 and the residual decoder 470, respectively. According to an embodiment, the feature data of the current optical flow may be input to the residual decoder 470.

The optical flow decoder 450 may output a plurality of current optical flows and a plurality of second weight data by processing the feature data of the current optical flow according to the parameters set through training.

The plurality of current optical flows and the plurality of second weight data, which are 1D or 2D data, may include a plurality of samples. The size of each of the current optical flows may be the same as that of each of the second weight data.

According to an embodiment, the size of each of the current optical flows and that of each of the second weight data may be the same as the size of the previous reconstructed image.

According to an embodiment, the plurality of current optical flows may have one-to-one correspondence with each of the plurality of second weight data. For example, when five current optical flows are output by the optical flow decoder 450, the number of second weight data output by the optical flow decoder 450 may also be five. However, the disclosure is not limited thereto, and as such, the number of current optical flows and the number second weight data may be different than five.

The plurality of current optical flows may be provided to the motion compensator 631. The motion compensator 631 may generate a plurality of preliminary prediction images by processing the previous reconstructed image according to the plurality of current optical flows.

The motion compensator 631 may warp the previous reconstructed image according to each of the plurality of current optical flows to generate the plurality of preliminary prediction images. The warping for generating the plurality of preliminary prediction images is merely an example, and the motion compensator 631 may perform various types of image processing for changing the previous reconstructed image, based on the plurality of current optical flows, in order to generate the plurality of preliminary prediction images.

The plurality of preliminary prediction images generated by the motion compensator 631 and the plurality of second weight data output by the optical flow decoder 450 may be provided to the weight applier 632.

The plurality of second weight data may be referred to as reliability or accuracy of the plurality of current optical flows.

The sample values included in the plurality of second weight data may indicate reliability or accuracy of the sample values included in the plurality of current optical flows. For example, sample values located at various positions in the plurality of second weight data may indicate reliability or accuracy of sample values located at corresponding positions in the plurality of current optical flows. The various positions may be predetermined positions. For example, each of the sample values included in a first second weighting data may indicate the reliability or accuracy of each of the sample values included in a first current optical flow corresponding to the first second weighting data, and each of the sample values included in a second second weight data may indicate the reliability or accuracy of each of the sample values included in a second current optical flow corresponding to the second second weight data.

The weight applier 632 may obtain a plurality of modified prediction images by applying the plurality of second weight data to the plurality of preliminary prediction images. For example, the weight applier 632 may obtain one modified prediction image by multiplying the sample values of a preliminary prediction image corresponding to one second weight data by the sample values of the one second weight data. The weight applier 632 may obtain another modified prediction image by multiplying the sample values of a preliminary prediction image corresponding to another second weight data by the sample values of the other second weight data.

As described above, because the plurality of second weight data may refer to the reliability or accuracy of the plurality of current optical flows, a final prediction image more similar to the current image may be generated by applying the reliability or accuracy to the plurality of preliminary prediction images.

According to an embodiment, a sum of sample values located at the same position in the plurality of second weight data may be 1. Accordingly, the positions of the samples of the final prediction image may be changed compared to the positions of the samples of the previous reconstructed image, but the sample values of the previous reconstructed image may be maintained without changes even in the final prediction image.

The plurality of modified prediction images may be provided to the combiner 633. The combiner 633 may obtain the final prediction image by combining the plurality of modified prediction images with one another. According to an embodiment, the combiner 633 may obtain the final prediction image by summing the sample values of the plurality of modified prediction images at the same position.

The residual decoder 470 may obtain the current residual image by processing the feature data of the current residual image according to the parameters set through training. The current residual image may be provided to the combiner 633.

According to an embodiment, the residual decoder 470 may obtain the current residual image by processing, according to the parameters set through training, a result of concatenating the feature data of the current residual image with the feature data of the current optical flow.

The combiner 633 may obtain a current reconstructed image by combining the final prediction image with the current residual image.

According to an embodiment, the combiner 633 may obtain the current reconstructed image by adding the sample values of the final prediction image and the sample values of the current residual image.

The prediction decoder 630-3 shown in FIG. 11 corresponds to the image encoding and/or decoding process described above with reference to FIG. 5. Each of the plurality of current optical flows may be understood as a set of position differences between the samples of the current image and the corresponding samples of the previous reconstructed image, namely, a set of motion vectors.

In other words, the prediction decoder 630-3 shown in FIG. 11 may obtain a set of several motion vectors, and may obtain a final prediction image more similar to the current image by using second weight data indicating the reliability or accuracy of the set.

According to an embodiment, the prediction decoder 630 may further include a weight decoder that processes the feature data of the current optical flow to output the plurality of second weight data. In this case, the optical flow decoder 450 may output the plurality of current optical flows by processing the feature data of the current optical flow, and the plurality of second weight data may be output by a weight decoder.

According to an embodiment, the weight decoder may process the feature data of the weight data to output the plurality of second weight data. The feature data of the weight data may be included in the bitstream, and the obtainer 610 may obtain the feature data of the weight data from the bitstream and provide the obtained feature data to the weight decoder.

According to an embodiment, the prediction decoder 630-3 may include a plurality of optical flow decoders 450 that output a pair of current optical flows and second weight data.

According to an embodiment, the prediction decoder 630-3 may include a plurality of optical flow decoders 450 and a plurality of weight decoders. In this case, each of the plurality of optical flow decoders 450 may output one (or more) current optical flow, and each of the plurality of weight decoders may output one (or more) second weight data.

Figure 12:
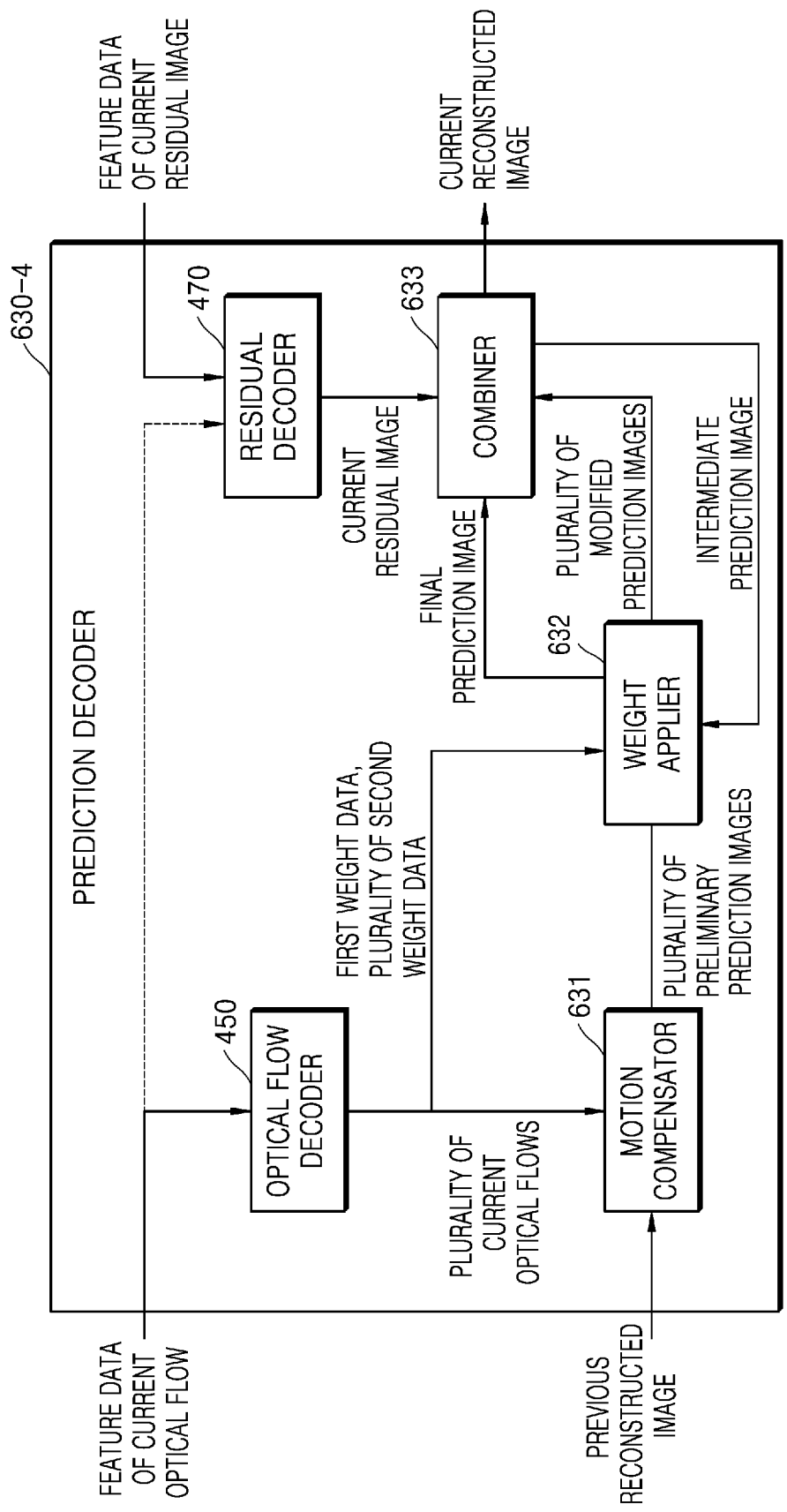
FIG. 12 is a block diagram of a configuration of a prediction decoder according to another embodiment.

FIG. 12 is a block diagram of a configuration of a prediction decoder 630-4 according to another embodiment.

The prediction decoder 630-4 shown in FIG. 12 may be provided to perform operations of the prediction decoder 630 shown in FIG. 8 and the prediction decoder 630-3 shown in FIG. 11.

Referring to FIG. 12, the prediction decoder 630-4 may include the optical flow decoder 450, the residual decoder 470, the motion compensator 631, the weight applier 632, and the combiner 633.

The optical flow decoder 450 and the residual decoder 470 may be implemented as neural networks including one or more layers (e.g., a convolutional layer).

The optical flow decoder 450 and the residual decoder 470 may be stored in a memory. According to an embodiment, the optical flow decoder 450 and the residual decoder 470 may be implemented as one or more dedicated processors for AI.

The feature data of the current optical flow and the feature data of the current residual image both output by the obtainer 610 may be input to the optical flow decoder 450 and the residual decoder 470, respectively. According to an embodiment, the feature data of the current optical flow may be input to the residual decoder 470.

The optical flow decoder 450 may output the plurality of current optical flows, the first weight data, and the plurality of second weight data by processing the feature data of the current optical flow according to the parameters set through training.

Each of the plurality of current optical flows, the first weight data, and each of the plurality of second weight data may include a plurality of samples. Each of the plurality of current optical flows, the first weight data, and each of the plurality of second weight data may be 1D or 2D data. The size of each of the current optical flows, the size of the first weight data, and the size of each of the plurality of second weight data may be the same as one another.

According to an embodiment, the size of each of the current optical flows, the size of the first weight data, and the size of each of the plurality of second weight data may be the same as that of the previous reconstructed image.

According to an embodiment, the plurality of current optical flows may have one-to-one correspondence with the plurality of second weight data.

The plurality of current optical flows may be provided to the motion compensator 631. The motion compensator 631 may generate the plurality of preliminary prediction images by processing the previous reconstructed image according to the plurality of current optical flows.

The motion compensator 631 may warp the previous reconstructed image according to each of the plurality of current optical flows to generate the plurality of preliminary prediction images. The warping for generating the plurality of preliminary prediction images is merely an example, and the motion compensator 631 may perform various types of image processing for changing the previous reconstructed image, based on the plurality of current optical flows, in order to generate the plurality of preliminary prediction images.

The plurality of preliminary prediction images generated by the motion compensator 631 and the plurality of second weight data output by the optical flow decoder 450 may be provided to the weight applier 632.

The plurality of second weight data may be referred to as reliability or accuracy of the plurality of current optical flows.

The weight applier 632 may obtain a plurality of modified prediction images by applying the plurality of second weight data to the plurality of preliminary prediction images. For example, the weight applier 632 may obtain one modified prediction image by multiplying the sample values of a preliminary prediction image corresponding to one second weight data by the sample values of the one second weight data. The weight applier 632 may obtain another modified prediction image by multiplying the sample values of a preliminary prediction image corresponding to another second weight data by the sample values of the other second weight data.

According to an embodiment, a sum of sample values located at the same position in the plurality of second weight data may be 1.

The plurality of modified prediction images may be provided to the combiner 633. The combiner 633 may obtain an intermediate prediction image by combining the plurality of modified prediction images with one another.

According to an embodiment, the combiner 633 may obtain the intermediate prediction image by summing the sample values of the plurality of modified prediction images at the same position.

The intermediate prediction image may be provided to the weight applier 632. The weight applier 632 may obtain a final prediction image by applying the sample values of the first weight data to the sample values of the intermediate prediction image.

According to an embodiment, the weight applier 632 may obtain the final prediction image by multiplying the sample values of the intermediate prediction image by the sample values of the first weight data.

The final prediction image generated by the weight applier 632 may be provided to the combiner 633.

The residual decoder 470 may obtain the current residual image by processing the feature data of the current residual image according to the parameters set through training. The current residual image may be provided to the combiner 633.

The combiner 633 may obtain a current reconstructed image by combining the final prediction image with the current residual image.

According to an example embodiment, the prediction decoder 630-4 may include at least one weight decoder for processing the feature data of the current optical flow to output the first weight data and the plurality of second weight data, and at least one optical flow decoder 450 for processing the feature data of the current optical flow to output the plurality of current optical flows.

According to an embodiment, the at least one weight decoder may include a weight decoder for processing the feature data of the current optical flow to output the first weight data, and a weight decoder for processing the feature data of the current optical flow to output the plurality of second weight data.

According to an embodiment, the at least one weight decoder may process the feature data of the weight data to output the first weight data and the plurality of second weight data. In this case, the feature data of the weight data may be included in the bitstream, and the obtainer 610 may obtain the feature data of the weight data from the bitstream and provide the obtained feature data to the weight decoder.

According to an embodiment, the prediction decoder 630-4 may include at least one optical flow decoder 450 for outputting the plurality of current optical flows and the first weight data, and at least one weight decoder for outputting the plurality of second weight data.

According to an embodiment, the prediction decoder 630-4 may include at least one optical flow decoder 450 for outputting the plurality of current optical flows and the plurality of second weight data, and a weight decoder for outputting the first weight data.

According to an embodiment, the prediction decoder 630-4 may include a plurality of optical flow decoders 450 each for outputting a pair of current optical flows and second weight data, and an optical flow decoder 450 (or a weight decoder) for outputting first weight data.

The prediction decoder 630-4 shown in FIG. 12 may obtain the plurality of modified prediction images by multiplying the plurality of preliminary prediction images by the plurality of second weight data, and may obtain the final prediction image by multiplying the intermediate prediction image corresponding to a result of combining the plurality of modified prediction images by the first weight data. This may be expressed by Equation 1 below. In Equation 1, i indicates an index.

Final prediction image=(Σ(preliminary prediction image [i]*second weight data [i]))*first weight data     [Equation 1]

Equation 1 below may be modified into Equation 2 below.

Final prediction image=Σ(preliminary prediction image [i]*second weight data [i]*first weight data)     [Equation 2]

According to an embodiment, the optical flow decoder 450 may output a plurality of third weight data corresponding to a result of multiplying the plurality of second weight data by the first weight data in Equation 2.

For example, the third weight data may be expressed by Equation 3 below.

Third weight data[i]=second weight data[i]*first weight data     [Equation 3]

The optical flow decoder 450 may obtain the plurality of third weight data by processing the feature data of the current optical flow, and provide the plurality of third weight data to the weight applier 632.

The weight applier 632 may obtain the plurality of transformed prediction images by applying the plurality of third weight data to the plurality of preliminary prediction images, and the combiner 633 may obtain the final prediction image by combining the plurality of transformed prediction images.

A configuration of the prediction decoder 630 when the optical flow decoder 450 outputs the plurality of third weight data may be the same as that of the prediction decoder 630-3 of FIG. 11. In this case, the optical flow decoder 450 of FIG. 11 may output the plurality of third weight data instead of the plurality of second weight data.

Figure 13:
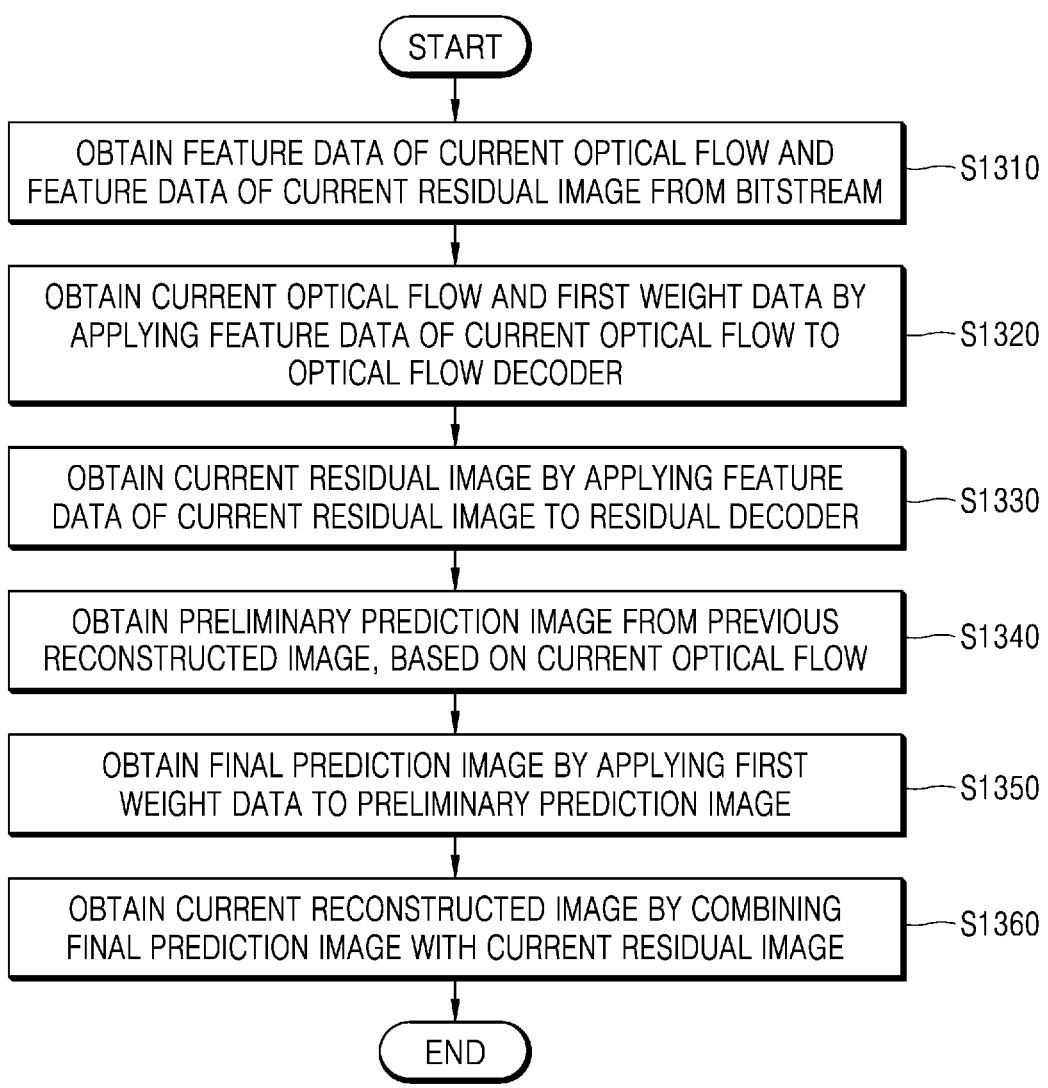
FIG. 13 is a flowchart of an image decoding method according to an embodiment.

FIG. 13 is a flowchart of an image decoding method according to an embodiment.

Referring to FIG. 13, in operation S1310, the image decoding apparatus 600 obtains the feature data of the current optical flow and the feature data of the current residual image from the bitstream.

According to an embodiment, the image decoding apparatus 600 may obtain the feature data of the current optical flow and the feature data of the current residual image by entropy-decoding, inversely quantizing, and/or inversely transforming the bits included in the bitstream.

According to an embodiment, the image decoding apparatus 600 may further obtain the feature data of the weight map from the bitstream.

In operation S1320, the image decoding apparatus 600 obtains the current optical flow and the first weight data by applying the feature data of the current optical flow to the optical flow decoder 450, which is based on a neural network.

According to an embodiment, the image decoding apparatus 600 may obtain the first weight data by applying the feature data of the weight data to the weight decoder 634.

In operation S1330, the image decoding apparatus 600 obtains the current residual image by applying the feature data of the current residual image to the residual decoder 470, which is based on a neural network.

In operation S1340, the image decoding apparatus 600 obtains the preliminary prediction image from the previous reconstructed image, based on the current optical flow. Warping may be used to obtain the preliminary prediction image.

In operation S1350, the image decoding apparatus 600 obtains the final prediction image by applying the first weight data to the preliminary prediction image.

According to an embodiment, the image decoding apparatus 600 may obtain the final prediction image by multiplying each of the sample values of the preliminary prediction image by each of the sample values of the first weight data.

In operation S1360, the image decoding apparatus 600 may obtain the current reconstructed image corresponding to the current image by combining the final prediction image with the current residual image.

According to an embodiment, the image decoding apparatus 600 may obtain the current reconstructed image by adding each of the sample values of the current residual image to each of the sample values of the final prediction image.

Figure 14:
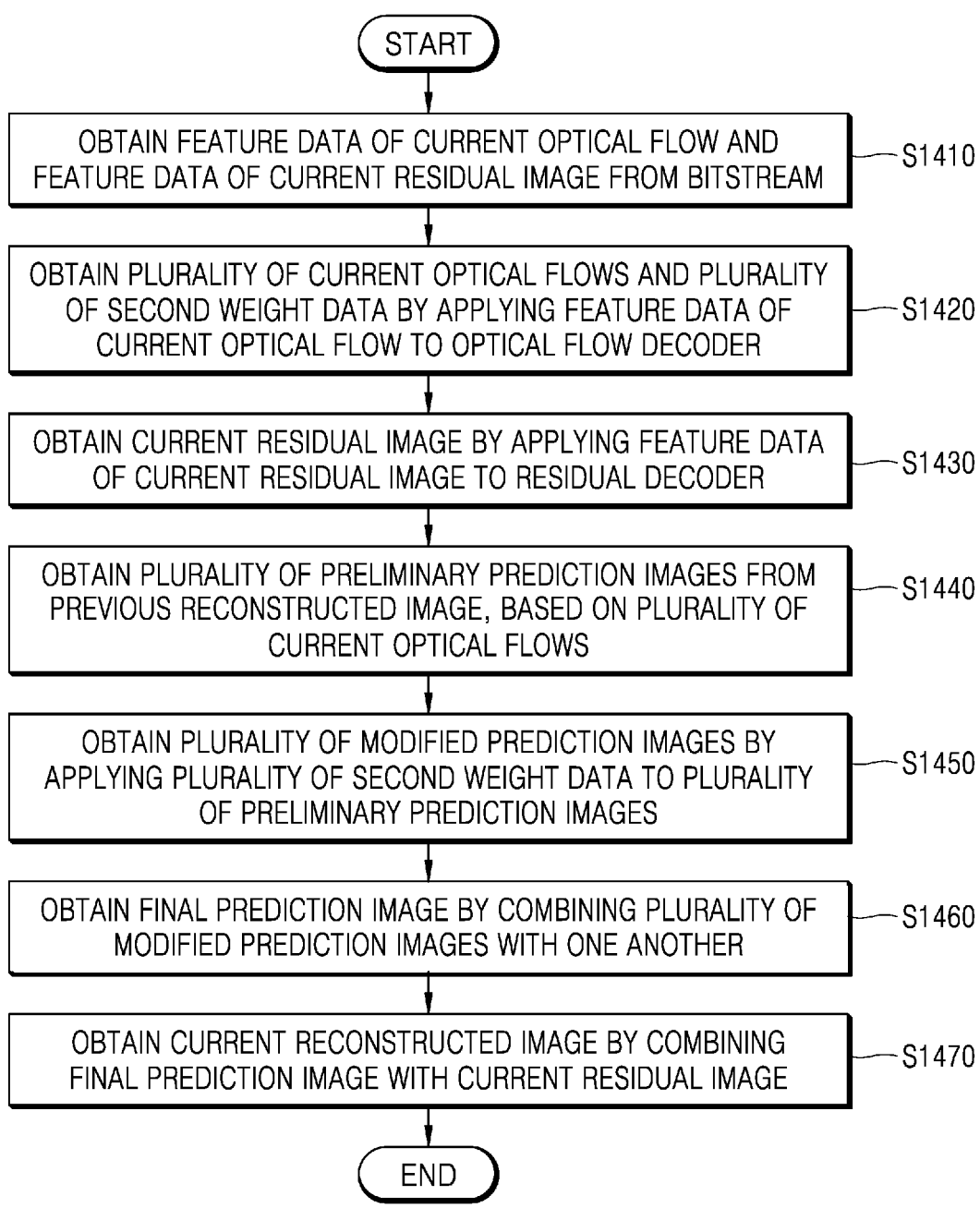
FIG. 14 is a flowchart of an image decoding method according to an embodiment.

FIG. 14 is a flowchart of an image decoding method according to an embodiment.

Referring to FIG. 14, in operation S1410, the image decoding apparatus 600 obtains the feature data of the current optical flow and the feature data of the current residual image from the bitstream.

According to an embodiment, the image decoding apparatus 600 may obtain the feature data of the current optical flow and the feature data of the current residual image by entropy-decoding, inversely quantizing, and/or inversely transforming the bits included in the bitstream.

According to an embodiment, the image decoding apparatus 600 may further obtain the feature data of the weight map from the bitstream.

In operation S1420, the image decoding apparatus 600 obtains the plurality of current optical flows and the plurality of second weight data by applying the feature data of the current optical flow to the optical flow decoder 450 based on a neural network.

According to an embodiment, the image decoding apparatus 600 may obtain the plurality of second weight data by applying the feature data of the weight data to the at least one weight decoder 634.

In operation S1430, the image decoding apparatus 600 obtains the current residual image by applying the feature data of the current residual image to the residual decoder 470 based on a neural network.

In operation S1440, the image decoding apparatus 600 obtains the plurality of preliminary prediction images from the previous reconstructed image, based on the plurality of current optical flows. Warping may be used to obtain the plurality of preliminary prediction images.

In operation S1450, the image decoding apparatus 600 obtains the plurality of modified prediction images by applying the plurality of second weight data to the plurality of preliminary prediction images.

According to an embodiment, the image decoding apparatus 600 may obtain the plurality of modified prediction images by multiplying each of the sample values of the plurality of preliminary prediction images by each of the sample values of the plurality of second weight data.

In operation S1460, the image decoding apparatus 600 obtains the final prediction image by combining the plurality of modified prediction images with one another.

According to an embodiment, the image decoding apparatus 600 may obtain the final prediction image by adding the sample values located at the same position in the plurality of modified prediction images.

In operation S1470, the image decoding apparatus 600 may obtain the current reconstructed image corresponding to the current image by combining the final prediction image with the current residual image.

According to an embodiment, the image decoding apparatus 600 may obtain the current reconstructed image by adding each of the sample values of the current residual image to each of the sample values of the final prediction image.

Figure 15:
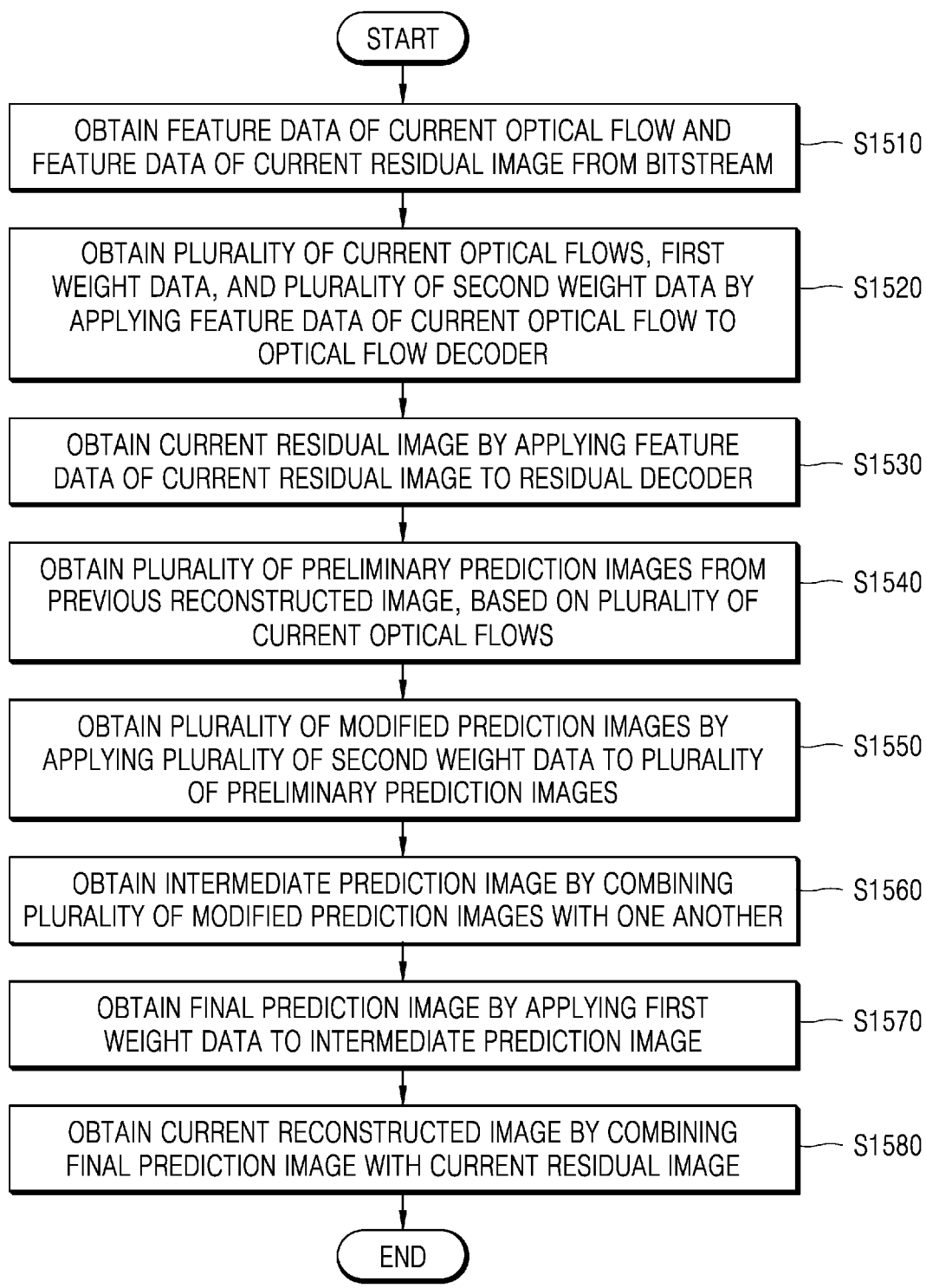
FIG. 15 is a flowchart of an image decoding method according to an embodiment.

FIG. 15 is a flowchart of an image decoding method according to an embodiment.

Referring to FIG. 15, in operation S1510, the image decoding apparatus 600 obtains the feature data of the current optical flow and the feature data of the current residual image from the bitstream.

According to an embodiment, the image decoding apparatus 600 may obtain the feature data of the current optical flow and the feature data of the current residual image by entropy-decoding, inversely quantizing, and/or inversely transforming the bits included in the bitstream.

According to an embodiment, the image decoding apparatus 600 may further obtain the feature data of the weight map from the bitstream.

In operation S1520, the image decoding apparatus 600 obtains the plurality of current optical flows, the first weight data, and the plurality of second weight data by applying the feature data of the current optical flow to the optical flow decoder 450 based on a neural network.

According to an embodiment, the image decoding apparatus 600 may obtain the first weight data and the plurality of second weight data by applying the feature data of the weight data to the at least one weight decoder 634.

In operation S1530, the image decoding apparatus 600 obtains the current residual image by applying the feature data of the current residual image to the residual decoder 470 based on a neural network.

In operation S1540, the image decoding apparatus 600 obtains the plurality of preliminary prediction images from the previous reconstructed image, based on the plurality of current optical flows. According to an example embodiment, warping may be used to obtain the plurality of preliminary prediction images.

In operation S1550, the image decoding apparatus 600 obtains the plurality of modified prediction images by applying the plurality of second weight data to the plurality of preliminary prediction images.

According to an embodiment, the image decoding apparatus 600 may obtain the plurality of modified prediction images by multiplying each of the sample values of the plurality of preliminary prediction images by each of the sample values of the plurality of second weight data.

In operation S1560, the image decoding apparatus 600 obtains the intermediate prediction image by combining the plurality of modified prediction images with one another.

According to an embodiment, the image decoding apparatus 600 may obtain the intermediate prediction image by adding the sample values located at the same position in the plurality of modified prediction images.

In operation S1570, the image decoding apparatus 600 obtains the final prediction image by applying the first weight data to the intermediate prediction image.

According to an embodiment, the image decoding apparatus 600 may obtain the final prediction image by multiplying each of the sample values of the intermediate prediction image by each of the sample values of the first weight data.

In operation S1580, the image decoding apparatus 600 may obtain the current reconstructed image corresponding to the current image by combining the final prediction image with the current residual image.

According to an embodiment, the image decoding apparatus 600 may obtain the current reconstructed image by adding each of the sample values of the current residual image to each of the sample values of the final prediction image.

An operation of an image encoding apparatus will now be described with reference to FIGS. 16 through 22.

Figure 16:
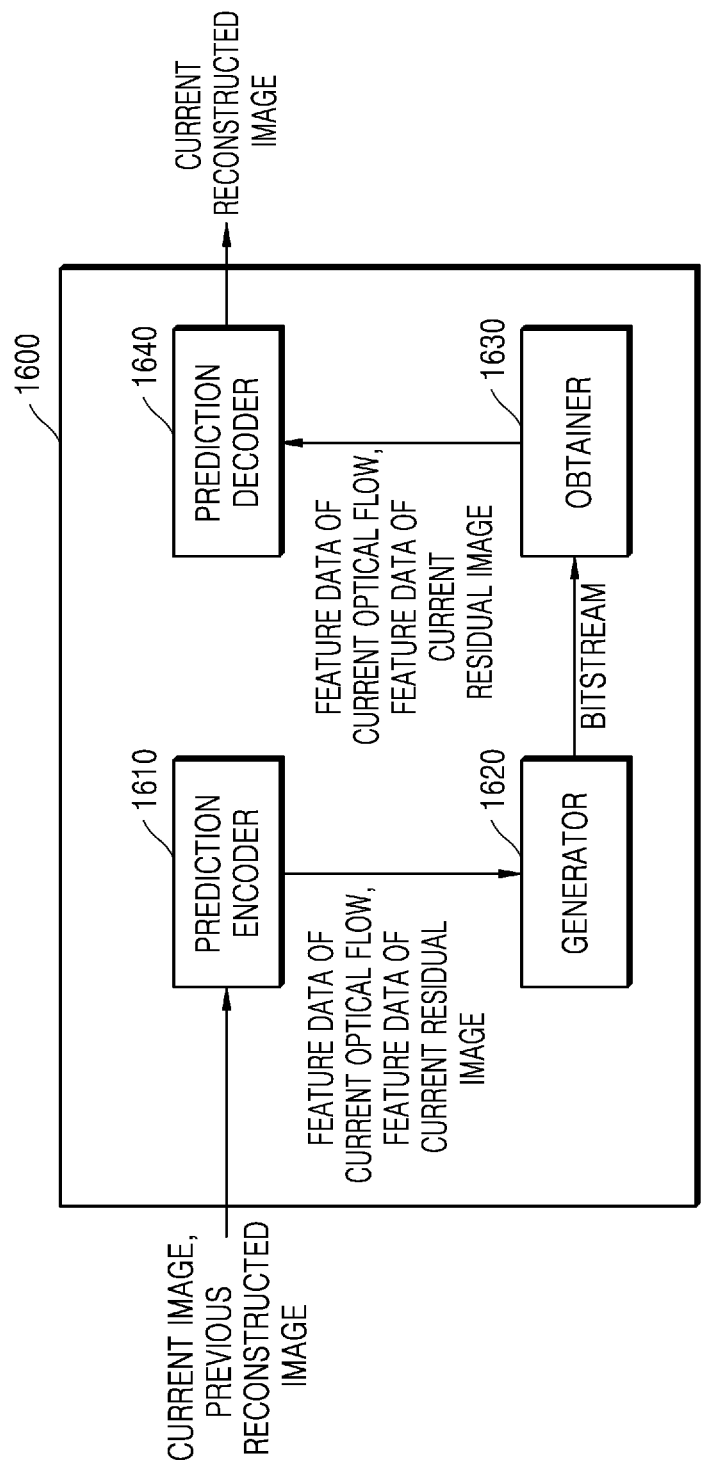
FIG. 16 is a block diagram of a structure of an image encoding apparatus according to an embodiment.

FIG. 16 is a block diagram of a structure of the image encoding apparatus 1600 according to an embodiment.

Referring to FIG. 16, the image encoding apparatus 1600 may include a prediction encoder 1610, a generator 1620, an obtainer 1630, and a prediction decoder 1640.

The prediction encoder 1610, the generator 1620, the obtainer 1630, and the prediction decoder 1640 may be implemented as processors. The prediction encoder 1610, the generator 1620, the obtainer 1630, and the prediction decoder 1640 may operate according to instructions stored in a memory.

Although the prediction encoder 1610, the generator 1620, the obtainer 1630, and the prediction decoder 1640 are individually illustrated in FIG. 16, the prediction encoder 1610, the generator 1620, the obtainer 1630, and the prediction decoder 1640 may be implemented as one processor. In this case, the prediction encoder 1610, the generator 1620, the obtainer 1630, and the prediction decoder 1640 may be implemented as a dedicated processor, or may be implemented through a combination of software and a general-purpose processor such as an application processor (AP), a central processing unit (CPU), or a graphics processing unit (GPU). The dedicated processor may include a memory for implementing an embodiment of the disclosure or a memory processing unit for using an external memory.

The prediction encoder 1610, the generator 1620, the obtainer 1630, and the prediction decoder 1640 may be implemented as a plurality of processors. In this case, the prediction encoder 1610, the generator 1620, the obtainer 1630, and the prediction decoder 1640 may be implemented as a combination of dedicated processors, or may be implemented through a combination of software and a plurality of general-purpose processors such as APs, CPUs, or GPUs.

The prediction encoder 1610 may obtain feature data of a current optical flow and feature data of a current residual image based on a current image and a previous reconstructed image. For example, the prediction encoder 1610 may receive a current image and a previous reconstructed image as input, and may output feature data of a current optical flow and feature data of a current residual image based on the current image and the previous reconstructed image.

The prediction encoder 1610 may use the optical flow encoder 410 and the residual encoder 430, both implemented based on a neural network, in order to obtain the feature data of the current residual optical flow and the feature data of the current residual image. An operation of the prediction encoder 1610 will be described in detail later with reference to FIGS. 17 and 18.

The feature data of the current optical flow and the feature data of the current residual image both obtained by the prediction encoder 1610 may be transmitted to the generator 1620.

The generator 1620 may generate a bitstream including the feature data of the current optical flow and the feature data of the current residual image.

According to an embodiment, the generator 1620 may generate a bitstream corresponding to the feature data of the current optical flow and the feature data of the current residual image. According to an example embodiment, the generator 1620 may generate a first bitstream corresponding to the feature data of the current optical flow and a second bitstream corresponding to the feature data of the current residual image.

The bitstream may be transmitted from the image decoding apparatus 600 through a network. According to an embodiment, the bitstream may be stored in a data storage medium including a magnetic medium (such as, a hard disk, a floppy disk, or a magnetic tape), an optical recording medium (such as, CD-ROM or DVD), or a magneto-optical medium (such as, a floptical disk).

The obtainer 1630 may obtain the feature data of the current optical flow and the feature data of the current residual image from the bitstream generated by the generator 1620.

However, the disclosure is not limited thereto, and as such, according to an embodiment, the obtainer 1630 may receive the feature data of the current optical flow and the feature data of the current residual image from the prediction encoder 1610.

The feature data of the current optical flow and the feature data of the current residual image may be transmitted to the prediction decoder 1640. For example, the obtainer 1630 may transmit the feature data of the current optical flow and the feature data of the current residual image to the prediction decoder 1640.

The prediction decoder 1640 may obtain a current reconstructed image by using the feature data of the current optical flow and the feature data of the current residual image.

The current reconstructed image obtained by the prediction decoder 1640 may be used in a process of encoding a next image.

Configurations and operations of the obtainer 1630 and the prediction decoder 1640 may correspond to those of the obtainer 610 and the prediction decoder 630 of the image decoding apparatus 600 described above.

For example, the configuration and operation of the obtainer 1630 may correspond to those of the obtainer 610 of FIG. 7, and the configuration and operation of the prediction decoder 1640 may correspond to those of any one of the prediction decoders 630, 630-1, 630-2, 630-3, and 630-4 of FIGS. 8 through 12.

Figure 17:
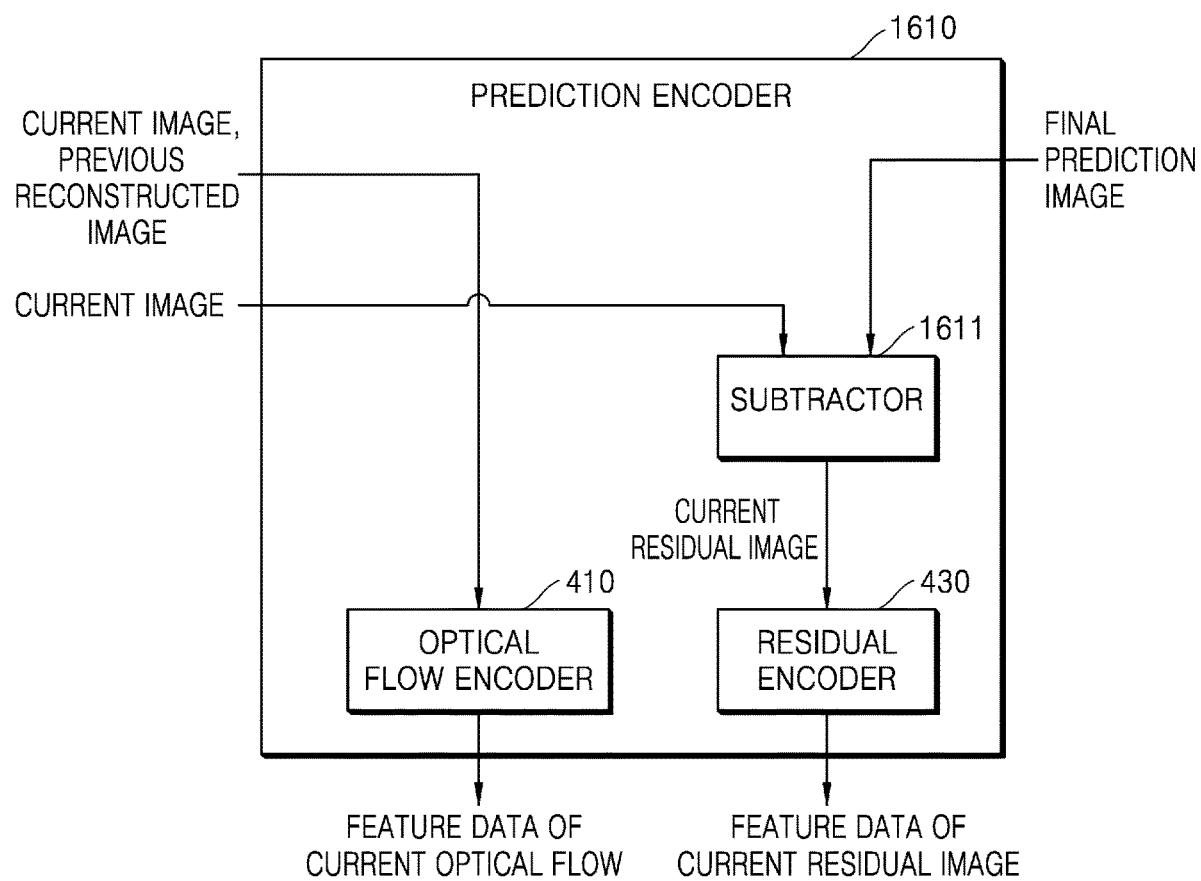
FIG. 17 is a block diagram of a configuration of a prediction encoder according to an embodiment.

FIG. 17 is a block diagram of a configuration of the prediction encoder 1610 according to an embodiment.

Referring to FIG. 17, the prediction encoder 1610 may include the optical flow encoder 410, the residual encoder 430, and a subtractor 1611.

The optical flow encoder 410 and the residual encoder 430 may be implemented as neural networks including one or more layers (e.g., a convolutional layer).

The optical flow encoder 410 and the residual encoder 430 may be stored in a memory. The optical flow encoder 410 and the residual encoder 430 may be implemented as at least one dedicated processor for AI.

The current image and the previous reconstructed image may be input to the optical flow encoder 410. The optical flow encoder 410 may obtain the feature data of the current optical flow by processing the current image and the previous reconstructed image according to the parameters set through training. The feature data of the current optical flow may be transmitted to the generator 1620.

The final prediction image generated from the previous reconstructed image based on the feature data of the current optical flow may be input to the subtractor 1611, together with the current image. The final prediction image may be generated by the prediction decoder 1640 and transmitted to the prediction encoder 1610. The process, performed by the prediction decoder 1640, of generating the final prediction image has been described above with reference to FIGS. 8 through 12, and thus a description thereof will be omitted herein.

The subtractor 1611 may obtain the current residual image corresponding to a difference between the current image and the final prediction image. For example, The subtractor 1611 may receive the current image and the final prediction image as inputs, perform a difference operation between the current image and the final prediction image, and output the current residual image based on a result of the difference between the current image and the final prediction image.

According to an embodiment, the subtractor 1611 may obtain the current residual image by subtracting the sample values of the final prediction image from the sample values of the current image.

The current residual image may be input to the residual encoder 430. The residual encoder 430 may obtain the feature data of the current residual image by processing the current residual image according to the parameters set through training. The feature data of the current residual image may be transmitted to the generator 1620.

According to the prediction encoder 1610 shown in FIG. 17, the bitstream including the feature data of the current optical flow and the feature data of the current residual image is generated, and thus the image decoding apparatus 600 may include any one of the prediction decoders 630, 630-1, 630-3, and 630-4 shown in FIGS. 8, 9, 11, and 12.

Figure 18:
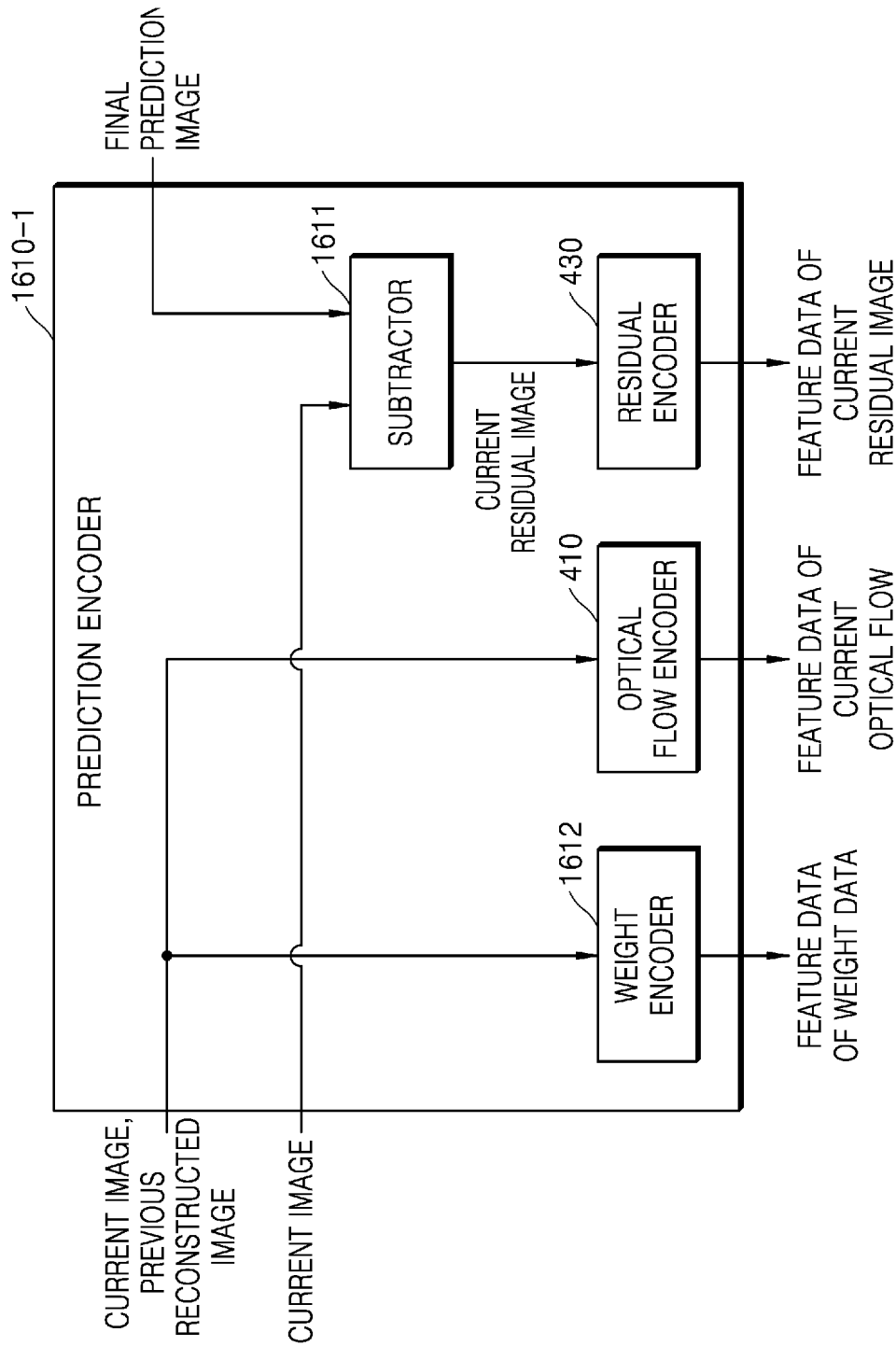
FIG. 18 is a block diagram of a configuration of a prediction encoder according to another embodiment.

FIG. 18 is a block diagram of a configuration of a prediction encoder 1610-1 according to another embodiment.

Referring to FIG. 18, the prediction encoder 1610-1 may include the optical flow encoder 410, the residual encoder 430, a weight encoder 1612, and the subtractor 1611.

The optical flow encoder 410, the residual encoder 430, and the weight encoder 1612 may be implemented as neural networks including one or more layers (e.g., a convolutional layer).

The optical flow encoder 410, the residual encoder 430, and the weight encoder 1612 may be stored in a memory. The optical flow encoder 410, the residual encoder 430, and the weight encoder 1612 may be implemented as at least one dedicated processor for AI.

The current image and the previous reconstructed image may be input to the optical flow encoder 410. The optical flow encoder 410 may obtain the feature data of the current optical flow by processing the current image and the previous reconstructed image according to the parameters set through training. The feature data of the current optical flow may be transmitted to the generator 1620.

The current image and the previous reconstructed image may be input to the weight encoder 1612. The weight encoder 1612 may obtain the feature data of the weight data by processing the current image and the previous reconstructed image according to the parameters set through training. The feature data of the weight data may be transmitted to the generator 1620.

The final prediction image generated from the previous reconstructed image based on the feature data of the current optical flow and the feature data of the weight data may be input to the subtractor 1611, together with the current image. The final prediction image may be generated by the prediction decoder 1640 and transmitted to the prediction encoder 1610.

The subtractor 1611 may obtain the current residual image corresponding to a difference between the current image and the final prediction image. According to an embodiment, the subtractor 1611 may obtain the current residual image by subtracting the sample values of the final prediction image from the sample values of the current image.

The current residual image may be input to the residual encoder 430. The residual encoder 430 may obtain the feature data of the current residual image by processing the current residual image according to the parameters set through training. The feature data of the current residual image may be transmitted to the generator 1620.

According to the prediction encoder 1610-1 shown in FIG. 18, the bitstream including the feature data of the current optical flow and the feature data of the weight data is generated, and thus the image decoding apparatus 600 may include the prediction decoder 630 that generates the final prediction image using the feature data of the weight data, for example, the prediction decoder 630-2 of FIG. 10.

As described above, the prediction decoder 630 of the image decoding apparatus 600 may obtain the first weight data and/or the plurality of second weight data by using the feature data of the weight data.

Figure 19:
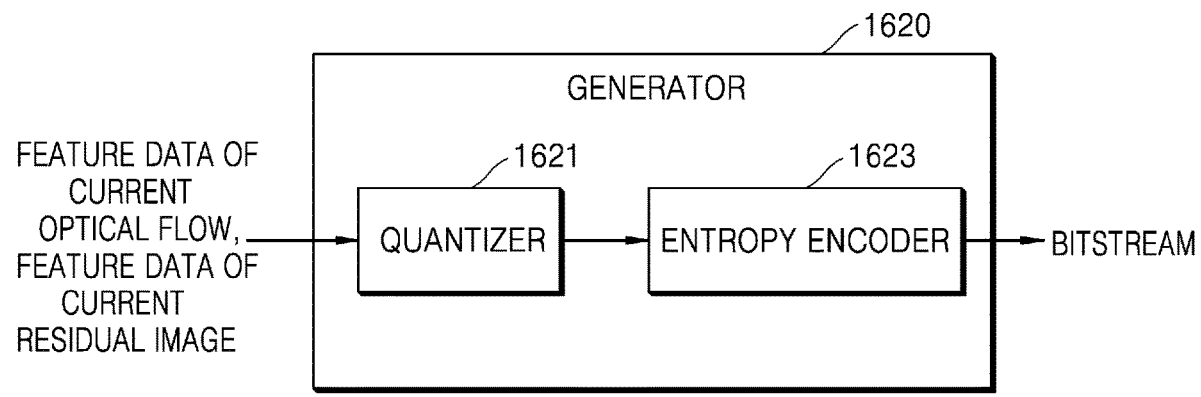
FIG. 19 is a block diagram of a configuration of a generator according to an embodiment.

FIG. 19 is a block diagram of a configuration of the generator 1620 according to an embodiment.

Referring to FIG. 19, the generator 1620 may include a quantizer 1621 and an entropy encoder 1623.

The quantizer 1621 may quantize the feature data of the current optical flow and the feature data of the current residual image.

The entropy encoder 1623 may generate the bitstream by entropy-coding the quantized feature data of the current optical flow and the quantized feature data of the current residual image.

According to an embodiment, the generator 1620 may further include a transformer. The transformer may transform the feature data of the current optical flow and the feature data of the current residual image from a spatial domain into a frequency domain, and provide a result of the transformation to the quantizer 1621.

According to an embodiment, the generator 1620 may not include the quantizer 1621. In other words, the bitstream including the feature data of the current optical flow and the feature data of the current residual image may be obtained through processing by the entropy encoder 1623.

According to an embodiment, the generator 1620 may generate the bitstream by binarizing the feature data of the current optical flow and the feature data of the current residual image. In other words, when the generator 1620 performs only binarization, the quantizer 1621 and the entropy encoder 1623 may not be included in the generator 1620.

According to an embodiment, the generator 1620 may generate the bitstream including the feature data of the weight data by applying at least one of transform, quantization, and entropy encoding to the feature data of the weight data transmitted by the prediction encoder 1610-1.

Figure 20:
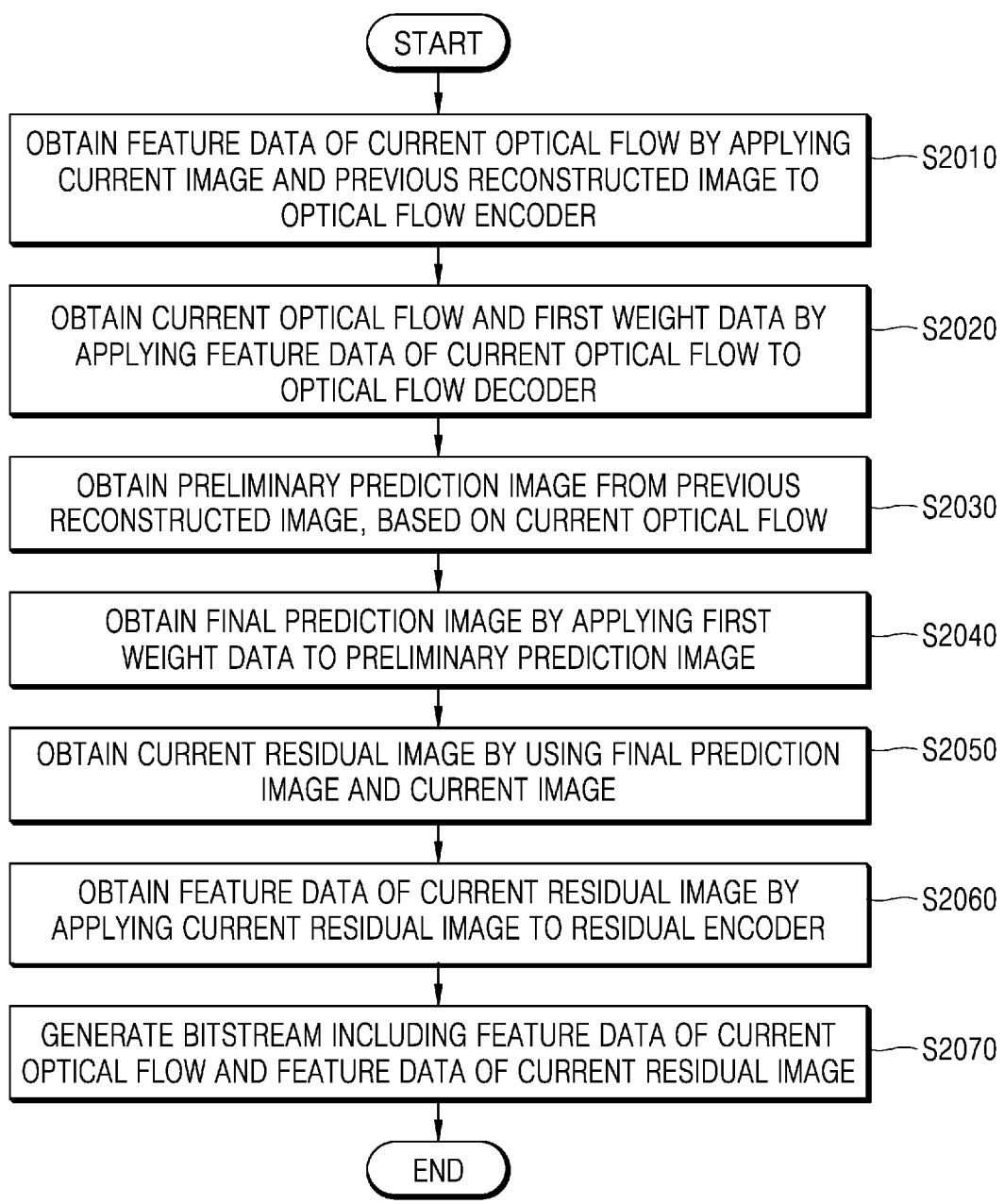
FIG. 20 is a flowchart of an image encoding method according to an embodiment.

FIG. 20 is a flowchart of an image encoding method according to an embodiment.

Referring to FIG. 20, in operation S2010, the image encoding apparatus 1600 obtains the feature data of the current optical flow by applying the current image and the previous reconstructed image to the optical flow encoder 410.

According to another embodiment, the image encoding apparatus 1600 may obtain the feature data of the weight data by applying the current image and the previous reconstructed image to the weight encoder 1612.

In operation S2020, the image encoding apparatus 1600 obtains the current optical flow and the first weight data by applying the feature data of the current optical flow to the optical flow decoder 450.

According to an embodiment, the image encoding apparatus 1600 may obtain the current optical flow by applying the feature data of the current optical flow to the optical flow decoder 450, and may obtain the first weight data by applying the feature data of the weight data to the weight decoder 634.

In operation S2030, the image encoding apparatus 1600 obtains the preliminary prediction image from the previous reconstructed image, based on the current optical flow. Warping may be used to obtain the preliminary prediction image.

In operation S2040, the image encoding apparatus 1600 obtains the final prediction image by applying the first weight data to the preliminary prediction image.

According to an embodiment, the image encoding apparatus 1600 may obtain the final prediction image by multiplying each of the sample values of the preliminary prediction image by each of the sample values of the first weight data.

In operation S2050, the image encoding apparatus 1600 obtains the current residual image by using the final prediction image and the current image.

According to an embodiment, the image encoding apparatus 1600 may obtain the current residual image by subtracting each of the sample values of the final prediction image from each of the sample values of the current image.

In operation S2060, the image encoding apparatus 1600 obtains the feature data of the current residual image by applying the current residual image to the residual encoder 430.

In operation S2070, the image encoding apparatus 1600 generates the bitstream including the feature data of the current optical flow and the feature data of the current residual image. According to an embodiment, the bitstream may further include the feature data of the weight data.

According to an embodiment, the image encoding apparatus 1600 may perform at least one of transformation, quantization, or entropy encoding on the feature data of the current optical flow and the feature data of the current residual image in order to generate the bitstream.

The processes described above with reference to FIG. 20 may be performed by the image encoding apparatus 1600 including one of the prediction encoders 1610 and 1610-1 shown in FIGS. 17 and 18 and one of the prediction decoders 630, 630-1, and 630-2 shown in FIGS. 8, 9, and 10 as the prediction decoder 1640.

Figure 21:
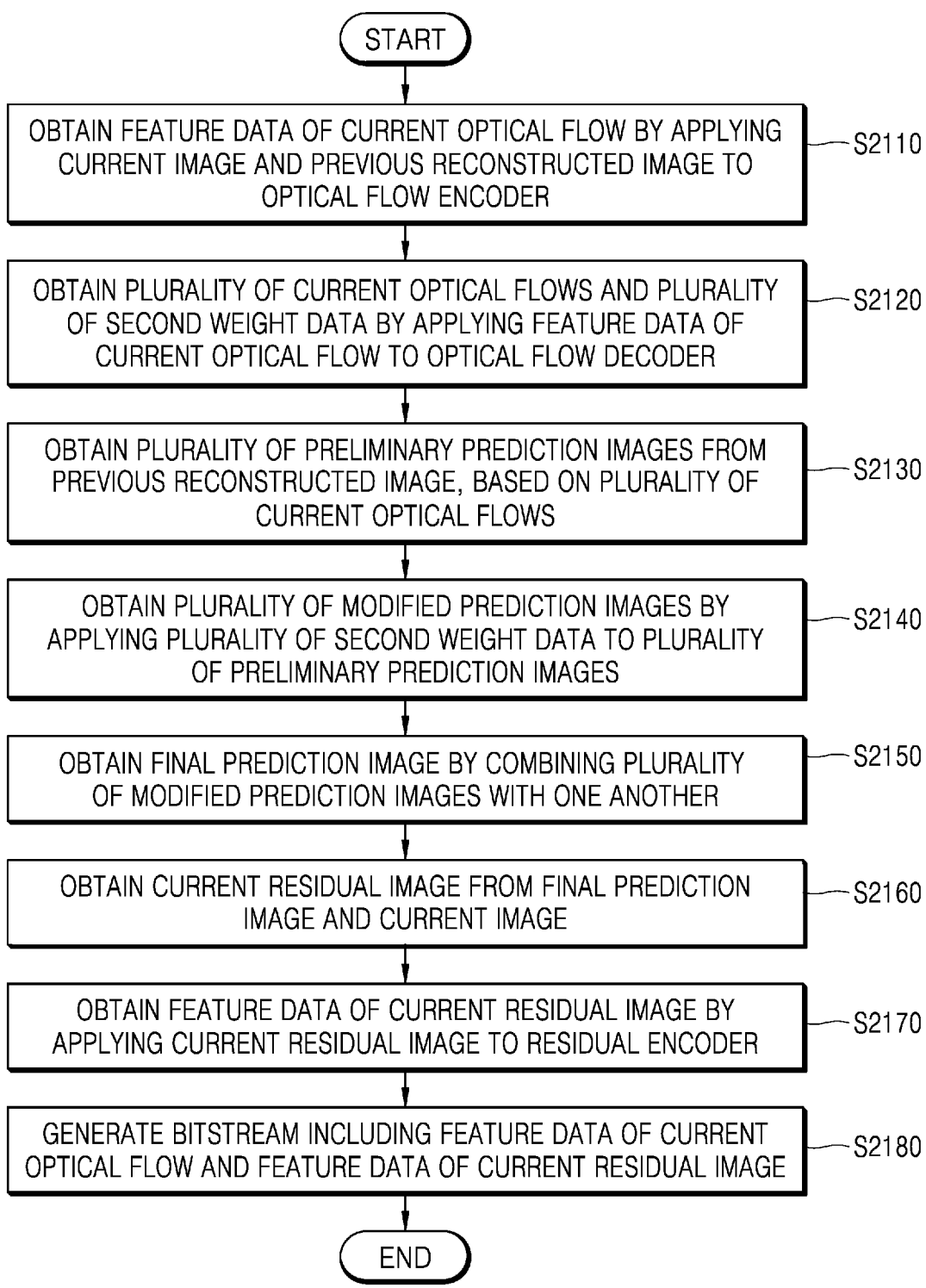
FIG. 21 is a flowchart of an image encoding method according to an embodiment.

FIG. 21 is a flowchart of an image encoding method according to an embodiment.

Referring to FIG. 21, in operation S2110, the image encoding apparatus 1600 obtains the feature data of the current optical flow by applying the current image and the previous reconstructed image to the optical flow encoder 410.

According to an embodiment, the image encoding apparatus 1600 may obtain the feature data of the weight data by applying the current image and the previous reconstructed image to the weight encoder 1612.

In operation S2120, the image encoding apparatus 1600 obtains the plurality of current optical flows and the plurality of second weight data by applying the feature data of the current optical flow to the optical flow decoder 450.

According to an embodiment, the image encoding apparatus 1600 may obtain the plurality of current optical flows by applying the feature data of the current optical flow to the optical flow decoder 450, and may obtain the plurality of second weight data by applying the feature data of the weight data to the weight decoder 634.

In operation S2130, the image encoding apparatus 1600 obtains the plurality of preliminary prediction images from the previous reconstructed image, based on the plurality of current optical flows. Warping may be used to obtain the plurality of preliminary prediction images.

In operation S2140, the image encoding apparatus 1600 obtains the plurality of modified prediction images by applying the plurality of second weight data to the plurality of preliminary prediction images.

According to an embodiment, the image encoding apparatus 1600 may obtain the plurality of modified prediction images by multiplying each of the sample values of the plurality of preliminary prediction images by each of the sample values of the plurality of second weight data.

In operation S2150, the image encoding apparatus 1600 obtains the final prediction image by combining the plurality of modified prediction images with one another.

According to an embodiment, the image encoding apparatus 1600 may obtain the final prediction image by adding the sample values located at the same position in the plurality of modified prediction images.

In operation S2160, the image encoding apparatus 1600 obtains the current residual image by using the final prediction image and the current image.

According to an embodiment, the image encoding apparatus 1600 may obtain the current residual image by subtracting each of the sample values of the final prediction image from each of the sample values of the current image.

In operation S2170, the image encoding apparatus 1600 obtains the feature data of the current residual image by applying the current residual image to the residual encoder 430.

In operation S2180, the image encoding apparatus 1600 generates the bitstream including the feature data of the current optical flow and the feature data of the current residual image.

According to an embodiment, the bitstream may further include the feature data of the weight data.

According to an embodiment, the image encoding apparatus 1600 may perform at least one of transformation, quantization, or entropy encoding on the feature data of the current optical flow and the feature data of the current residual image in order to generate the bitstream.

The processes described above with reference to FIG. 21 may be performed by the image encoding apparatus 1600 including one of the prediction encoders 1610 and 1610-1 shown in FIGS. 17 and 18 and the prediction decoder 630-3 shown in FIG. 11 as the prediction decoder 1640.

Figure 22:
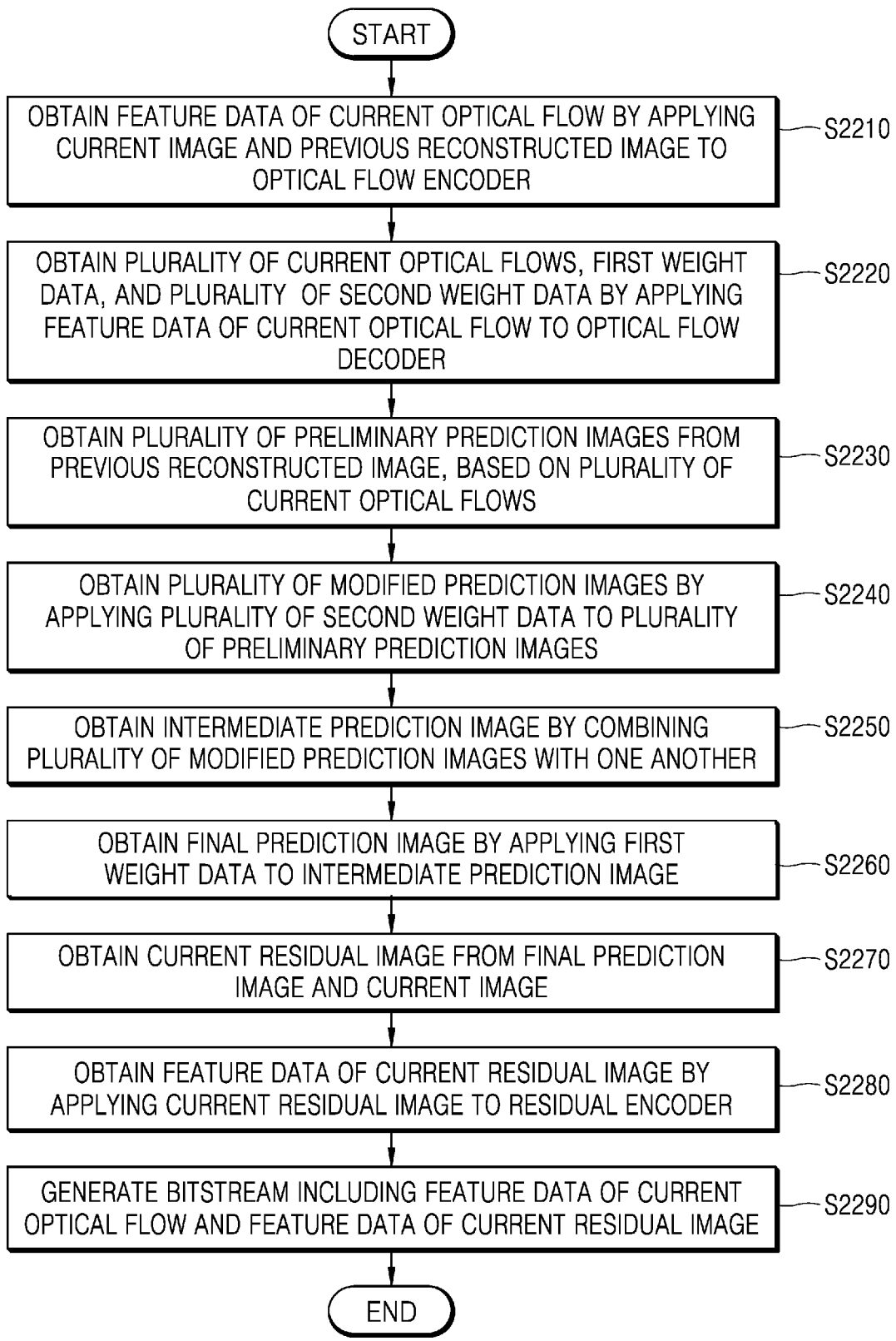
FIG. 22 is a flowchart of an image encoding method according to an embodiment.

FIG. 22 is a flowchart of an image encoding method according to an embodiment.

Referring to FIG. 22, in operation S2210, the image encoding apparatus 1600 obtains the feature data of the current optical flow by applying the current image and the previous reconstructed image to the optical flow encoder 410.

According to an embodiment, the image encoding apparatus 1600 may obtain the feature data of the weight data by applying the current image and the previous reconstructed image to the weight encoder 1612.

In operation S2220, the image encoding apparatus 1600 obtains the plurality of current optical flows, the first weight data, and the plurality of second weight data by applying the feature data of the current optical flow to the optical flow decoder 450.

According to an embodiment, the image encoding apparatus 1600 may obtain the plurality of current optical flows by applying the feature data of the current optical flow to the optical flow decoder 450, and may obtain the first weight data and the plurality of second weight data by applying the feature data of the weight data to the weight decoder 634.

In operation S2230, the image encoding apparatus 1600 obtains the plurality of preliminary prediction images from the previous reconstructed image, based on the plurality of current optical flows. Warping may be used to obtain the plurality of preliminary prediction images.

In operation S2240, the image encoding apparatus 1600 obtains the plurality of modified prediction images by applying the plurality of second weight data to the plurality of preliminary prediction images.

According to an embodiment, the image encoding apparatus 1600 may obtain the plurality of modified prediction images by multiplying each of the sample values of the plurality of preliminary prediction images by each of the sample values of the plurality of second weight data.

In operation S2250, the image encoding apparatus 1600 obtains the intermediate prediction image by combining the plurality of modified prediction images with one another.

According to an embodiment, the image encoding apparatus 1600 may obtain the intermediate prediction image by adding the sample values located at the same position in the plurality of modified prediction images.

In operation S2260, the image encoding apparatus 1600 obtains the final prediction image by applying the first weight data to the intermediate prediction image.

According to an embodiment, the image encoding apparatus 1600 may obtain the final prediction image by multiplying each of the sample values of the intermediate prediction image by each of the sample values of the first weight data.

In operation S2270, the image encoding apparatus 1600 obtains the current residual image by using the final prediction image and the current image.

According to an embodiment, the image encoding apparatus 1600 may obtain the current residual image by subtracting each of the sample values of the final prediction image from each of the sample values of the current image.

In operation S2280, the image encoding apparatus 1600 obtains the feature data of the current residual image by applying the current residual image to the residual encoder 430.

In operation S2290, the image encoding apparatus 1600 generates the bitstream including the feature data of the current optical flow and the feature data of the current residual image.

According to an embodiment, the bitstream may further include the feature data of the weight data.

According to an embodiment, the image encoding apparatus 1600 may perform at least one of transformation, quantization, or entropy encoding on the feature data of the current optical flow and the feature data of the current residual image in order to generate the bitstream.

The processes described above with reference to FIG. 22 may be performed by the image encoding apparatus 1600 including one of the prediction encoders 1610 and 1610-1 shown in FIGS. 17 and 18 and the prediction decoder 630-4 shown in FIG. 12 as the prediction decoder 1640.

At least one of the optical flow encoder 410, the residual encoder 430, the optical flow decoder 450, the residual decoder 470, the weight encoder 1612, or the weight decoder 634 may include a convolutional layer.

A structure of one or more of the optical flow encoder 410, the residual encoder 430, the optical flow decoder 450, the residual decoder 470, the weight encoder 1612, or the weight decoder 634 may have will now be described with reference to FIG. 23.

Figure 23:
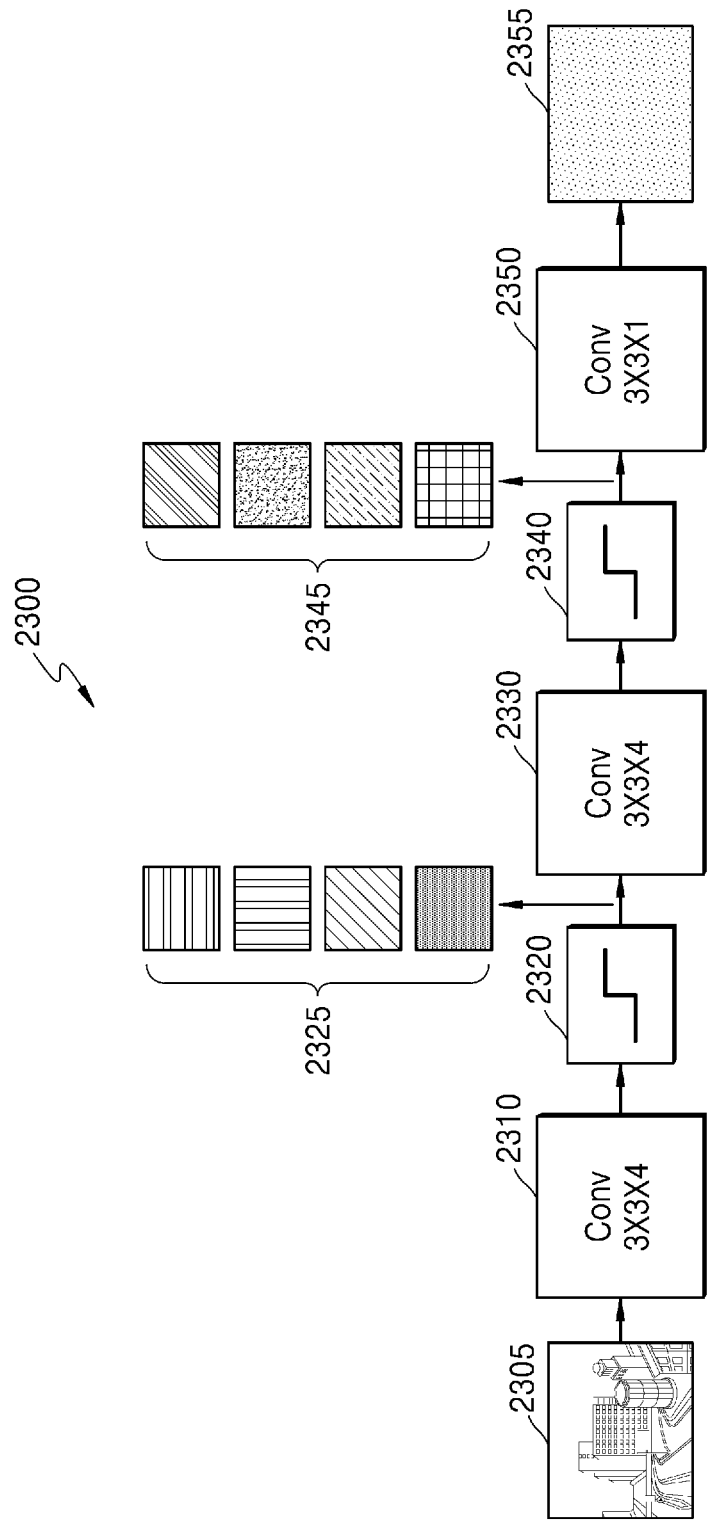
FIG. 23 is a diagram illustrating a structure of a neural network according to an embodiment.

FIG. 23 is a diagram illustrating a structure of a neural network 2300 according to an embodiment.

As shown in FIG. 23, input data 2305 is input to a first convolutional layer 2310. The input data 2305 varies according to whether the neural network 2300 serves as the optical flow encoder 410, the residual encoder 430, the optical flow decoder 450, the residual decoder 470, the weight encoder 1612, or the weight decoder 634.

According to an embodiment, when the neural network 2300 corresponds to an implementation of the optical flow encoder 410, the input data 2305 may be a current image and a previous reconstructed image, and when the neural network 2300 corresponds to an implementation of the residual decoder 470, the input data 2305 may be feature of a current residual image.

The indication 3×3×4 marked on the first convolutional layer 2310 of FIG. 23 indicates that convolution is performed on one piece of input data 2305 by using four filter kernels having a 3×3 size. Four feature maps are generated by the four filter kernels as a result of the convolution.

The feature maps generated by the first convolutional layer 2310 represent unique features of the input data 2305. For example, each feature map may represent vertical direction characteristics, horizontal direction characteristics, or edge characteristics of the input data 2305.

A convolution operation in the first convolutional layer 2310 will be described below in detail with reference to FIG. 24.

Figure 24:
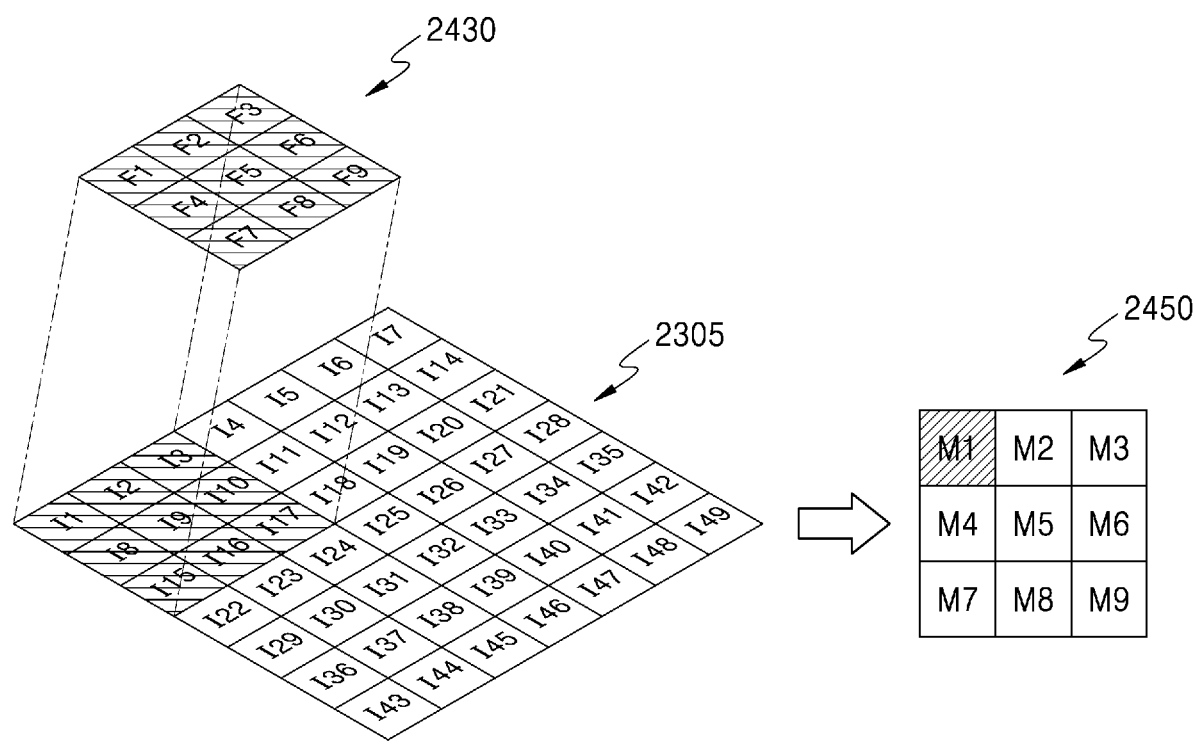
FIG. 24 is a view for describing a convolution operation performed in a convolutional layer, according to an embodiment.

Referring to FIG. 24, a single feature map 2450 may be generated through multiplication and addition between parameters of a filter kernel 2430 having a size of 3×3 used in the first convolutional layer 2310 and sample values in the input data 2305 corresponding to the parameters. Because four filter kernels are used in the first convolutional layer 2310, the four feature maps may be generated through a convolution operation process using the four filter kernels.

In FIG. 24, I1 through I49 marked on the first image 2305 indicate samples of the input data 2305, and F1 through F9 marked on the filter kernel 2430 indicate samples (which may be referred to as parameters) of the filter kernel 2430. M1 through M9 marked on the feature map 2450 indicate samples of the feature map.

In the convolution operation, multiplication between sample values of I1, I2, I3, I8, I9, I10, I15, I16, and I17 of the input data 2305 and F1, F2, F3, F4, F5, F6, F7, F8 and F9 of the filter kernel 2430 may be respectively performed, and a value of combination (for example, addition) of resultant values of the multiplication may be allocated as the value of M1 of the feature map 2450. When the stride of the convolution operation is 2, multiplication between sample values of I3, I4, I5, I10, I11, I12, I17, I18, and I19 of the input data 2305 and F1, F2, F3, F4, F5, F6, F7, F8 and F9 of the filter kernel 2430 may be respectively performed, and a value of combination of resultant values of the multiplication may be allocated as the value of M2 of the feature map 2450.

While the filter kernel 2430 is moving according to the stride until reaching a last sample of the input data 2305, the convolution operation between the sample values within the input data 2305 and the samples of the filter kernel 2430 may be performed, and thus the feature map 2450 having a certain size may be obtained.

According to the an example embodiment, values of the parameters of the neural network 2300, for example, the samples of the filter kernel 2430 used in the convolutional layers of the neural network 2300 (e.g., F1, F2, F3, F4, F5, F6, F7, F8 and F9 of the filter kernel) may be optimized through training of the neural network 2300.

The convolutional layers included in the neural network 2300 may perform the convolution operation of FIG. 24, but the convolution operation of FIG. 24 is only an example. As such, the disclosure is not limited thereto, and according to another embodiment, the convolution operation may be performed in a different manner.

Referring back to FIG. 23, the feature maps of the first convolutional layer 2310 are input to a first activation layer 2320.

The first activation layer 2320 may impart non-linear characteristics to each of the feature maps. The first activation layer 2320 may include, but is not limited to, a sigmoid function, a Tan h function, a Rectified Linear Unit (ReLU) function, and the like.

The first activation layer 2320 imparting non-linear characteristics refers to changing and outputting some sample values of the feature maps. This change is performed using the non-linear characteristics.

The first activation layer 2320 determines whether to transmit the sample values of the feature maps to a second convolutional layer 2330. For example, some of the sample values of the feature may be are activated by the first activation layer 2320 and transmitted to the second convolutional layer 2330, and some other sample values may not activated by the first activation layer 2320 and may not transmitted to the second convolutional layer 2330. Unique characteristics of the input data 2305 indicated by the feature maps may be emphasized by the first activation layer 2320.

Feature maps 2325 output by the first activation layer 2320 are input to the second convolutional layer 2330. One of the feature maps 2325 of FIG. 23 may be a result obtained by processing the feature map 2450 of FIG. 24 in the first activation layer 2320.

The indication 3×3×4 marked on the second convolutional layer 2330 indicates that convolution is performed on the input feature maps by using four filter kernels having a 3×3 size. An output of the second convolutional layer 2330 is input to a second activation layer 2340. The second activation layer 2340 may impart non-linear characteristics to input feature maps.

Feature maps 2345 output by the second activation layer 2340 are input to a third convolutional layer 2350. The indication 3×3×1 marked on the third convolutional layer 2350 indicates that convolution is performed to create one piece of output data 2355 by using one filter kernel having a 3×3 size.

The output data 2355 varies according to whether the neural network 2300 corresponds to an implementation of the optical flow encoder 410, the residual encoder 430, the optical flow decoder 450, the residual decoder 470, the weight encoder 1612, or the weight decoder 634.

For example, when the neural network 2300 corresponds to an implementation of the residual encoder 430, the output data 2355 may be the feature data of the current residual image, and, when the neural network 2300 corresponds to an implementation of the optical flow encoder 410, the output data 2355 may be the feature data of the current optical flow.

According to an embodiment, the number of pieces of output data 2355 may be controlled via adjustment of the number of filter kernels used by the third convolutional layer 2350. For example, when the neural network 2300 is the optical flow decoder 450 and the number of filter kernels used by the third convolutional layer 2350 is two, the output data 2355 may include a current optical flow and first weight data. For example, when the neural network 2300 is the optical flow decoder 450 and the number of filter kernels used by the third convolutional layer 2350 is ten, the output data 2355 may include five current optical flows and five second weight data.

In other words, even when the neural network 2300 corresponds to any of the optical flow encoder 410, the residual encoder 430, the optical flow decoder 450, the residual decoder 470, the weight encoder 1612, and the weight decoder 634, the number of output data 2355 may be adjusted by adjusting the number of filter kernels used by the third convolutional layer 2350.

FIG. 23 illustrates the neural network 2300 including three convolutional layers (i.e., first, second, and third convolutional layers 2310, 2330, and 2350) and two activation layers (i.e., first and second activation layers 2320 and 2340), but this is merely an example. According to an embodiment, the respective numbers of convolutional layers and activation layers included in the neural network 2300 may vary.

According to an embodiment, the neural network 2300 may be implemented as a recurrent neural network (RNN). This case refers to changing a CNN structure of the neural network 2300 to an RNN structure.

According to an embodiment, the image decoding apparatus 600 and the image encoding apparatus 1600 may include at least one arithmetic logic unit (ALU) for the above-described convolution operation and an operation of an activation layer.

The ALU may be implemented as a processor. For the convolution operation, the ALU may include a multiplier for multiplying the sample values of the input data 2305 or the sample values of a feature map output by a previous layer by the sample values of a filter kernel, and an adder for adding resultant values of the multiplication.

For the operation of the activation layer, the ALU may include a multiplier for multiplying an input sample value by a weight used in a pre-determined sigmoid function, Tan h function, or ReLU function, and a comparator for comparing a result of the multiplication with a predetermined value to determine whether to transmit the input sample value to a next layer.

A method of training neural networks 2300 used in an image encoding and decoding process will now be described with reference to FIGS. 25 and 26.

Figure 25:
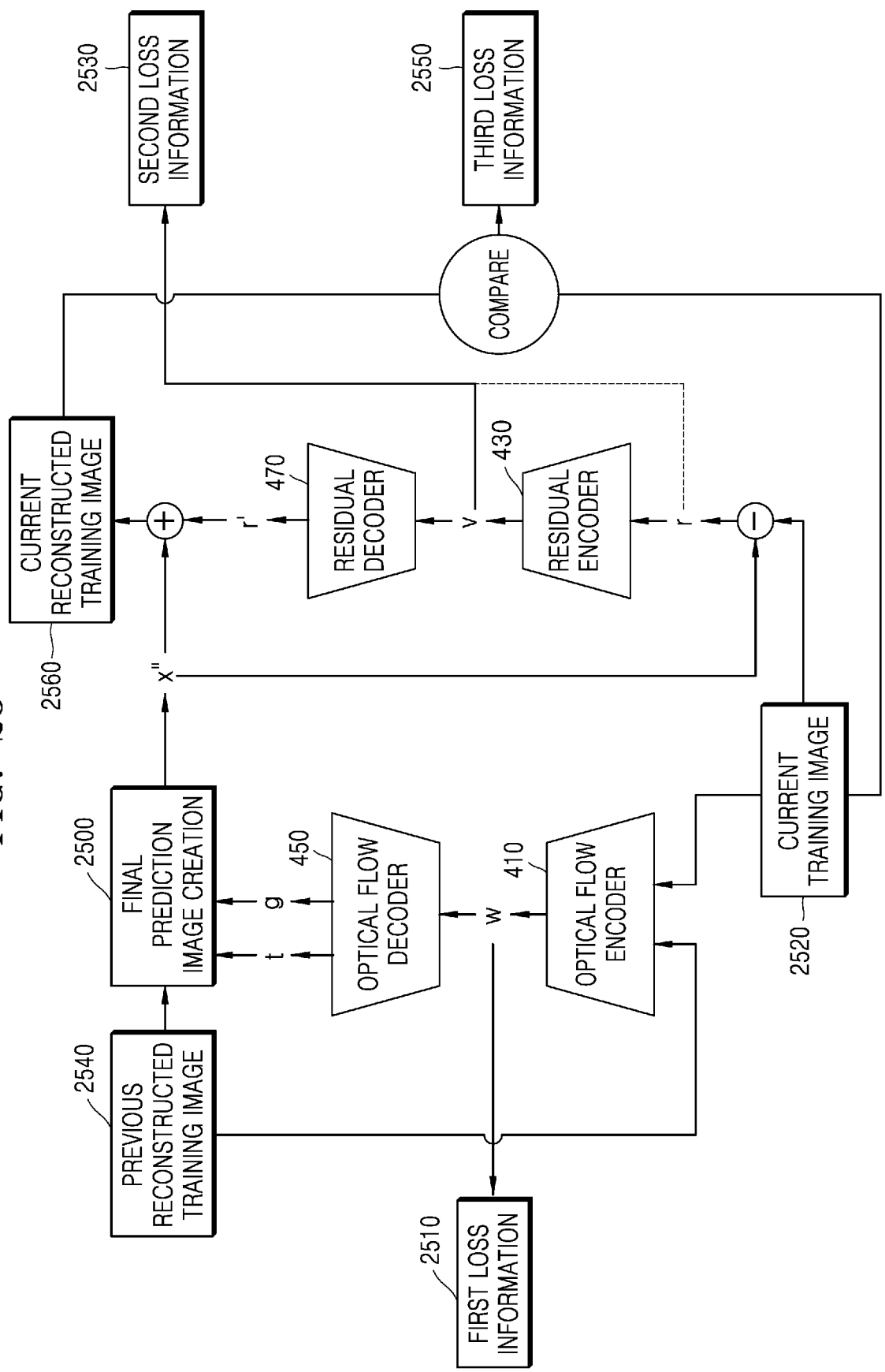
FIG. 25 is a diagram for describing a method of training an optical flow encoder, an optical flow decoder, a residual encoder, and a residual decoder, according to an embodiment.

FIG. 25 is a diagram for describing a method of training the optical flow encoder 410, the residual encoder 430, the optical flow decoder 450, and the residual decoder 470.

According to an example embodiment, the weight encoder 1612 and the weight decoder 634 may be trained together with the optical flow encoder 410, the residual encoder 430, the optical flow decoder 450, and the residual decoder 470.

According to an embodiment, FIG. 25 illustrate that weight data t is output by the optical flow decoder 450, and, when the feature data w of the current optical flow is processed by the weight decoder 634 and the weight data t is output by the weight decoder 634, the weight decoder 634 may also be trained according to the training method to be described with reference to FIG. 25.

According to an embodiment, FIG. 25 illustrates that, as a current training image 2520 and a previous reconstructed training image 2540 are processed by the optical flow encoder 410, the feature data w of the current optical flow is output, and the current training image 2520 and the previous reconstructed training image 2540 may be processed by the weight encoder 1612 to output the feature data of the weight data. The feature data of the weight data may be processed by the weight decoder 634 to output the weight data t. In this case, the weight encoder 1612 and the weight decoder 634 may also be trained according to the training method to be described with reference to FIG. 25.

In FIG. 25, the current training image 2520, the previous reconstructed training image 2540, and a current reconstructed training image 2560 correspond to the aforementioned current image, the aforementioned previous reconstructed image, and the aforementioned current reconstructed image, respectively.

When the optical flow encoder 410, the residual encoder 430, the optical flow decoder 450, and the residual decoder 470 are trained, a similarity between the current reconstructed training image 2560 and the current training image 2520 and a bit rate of a bitstream generated through encoding of the current training image 2520 or respective sizes of the sample values of a residual training image r may be considered.

To this end, according to an embodiment, at least one of first loss information 2510, second loss information 2530, or third loss information 2550 may be calculated, and the optical flow encoder 410, the residual encoder 430, the optical flow decoder 450, and the residual decoder 470 may be trained according to the calculated loss information.

Referring to FIG. 25, the current training image 2520 and the previous reconstructed training image 2540 may be input to the optical flow encoder 410. The optical flow encoder 410 may output the feature data w of the current optical flow by processing the current training image 2520 and the previous reconstructed training image 2540.

According to an embodiment, the current training image 2520 and the previous reconstructed training image 2540 may be input to the weight encoder 1612, and the feature data of the weight data may be output by the weight encoder 1612.

The feature data w of the current optical flow may be input to the optical flow decoder 450, and the optical flow decoder 450 may output the current optical flow g and the weight data t by processing the feature data w of the current optical flow. The weight data t may include the first weight data or the plurality of second weight data. According to an embodiment, the weight data t may include the first weight data and the plurality of second weight data.

According to an embodiment, the weight decoder 634 may process the feature data w of the current optical flow to output the weight data t.

A final prediction training image x" similar to the current training image 2520 may be obtained by applying final prediction image creation 2500 to the previous reconstructed training image 2540, based on the current optical flow g and the weight data t.

The final prediction training image x" may be created according to a final prediction image creation process by any one of the prediction decoders 630, 630-1, 630-2, 630-3, and 630-4 described above with reference to FIGS. 8 through 12.

For example, when the weight data t includes the first weight data, a preliminary prediction training image may be obtained through warping with respect to the previous reconstructed training image 2540, and the final prediction training image x" may be obtained by applying the first weight data to the preliminary prediction training image.

As another example, a plurality of preliminary prediction training images may be obtained through warping with respect to the previous reconstructed training image 2540, based on a plurality of current optical flows g, and a plurality of modified prediction training images may be obtained by applying a plurality of second weight data to the plurality of preliminary prediction training images. The plurality of modified prediction training images may be combined to obtain the final prediction training image x".

The residual training image r corresponding to a difference between the final prediction image x" and the current image 2520 may be input to the residual encoder 430.

The residual encoder 430 may output the feature data v of the residual training image r by processing the residual training image.

The residual decoder 470 may obtain a reconstructed residual training image r' by processing the feature data v of the residual training image.

The current reconstructed training image 2560 may be obtained by combining the reconstructed residual training image r with the final prediction training image x".

In order to train the optical flow encoder 410, the residual encoder 430, the optical flow decoder 450, and the residual decoder 470 (and the weight encoder 1612 and the weight decoder 634), at least one of the first loss information 2510, the second loss information 2530, or the third loss information 2550 may be obtained.

The first loss information 2510 may be calculated from at least one of the sample values of the feature data w of the current optical flow, entropy of the feature data w of the current optical flow, or a bit rate of a bitstream corresponding to the feature data w of the current optical flow.

The second loss information 2530 may be calculated from the sample values of the residual training image r, entropy of the feature data v of the residual training image, or a bit rate of a bitstream corresponding to the feature data v of the residual training image.

Because the first loss information 2510 and the second loss information 2530 are related to the efficiency of encoding the current training image 2520, the first loss information 2510 and the second loss information 2530 may be referred to as compression loss information.

According to an embodiment, although the first loss information 2510 and the second loss information 2530 related to the efficiency of encoding of the current training image 2520 are derived in FIG. 25, one piece of loss information corresponding to the bitrate of one bitstream generated through encoding of the current training image 2520 may be derived.

The third loss information 2550 may correspond to a difference between the current training image 2520 and the current reconstructed training image 2560. The difference between the current training image 2520 and the current reconstructed training image 2560 may include at least one of a L1-norm value, an L2-norm value, a Structural Similarity (SSIM) value, a Peak Signal-To-Noise Ratio-Human Vision System (PSNR-HVS) value, a Multiscale SSIM (MS-SSIM) value, a Variance Inflation Factor (VIF) value, or a Video Multimethod Assessment Fusion (VMAF) value between the current training image 2520 and the current reconstructed training image 2560.

Because the third loss information 2550 is related to the quality of the current reconstructed training image 2560, the third loss information 2550 may be referred to as quality loss information.

The optical flow encoder 410, the residual encoder 430, the optical flow decoder 450, and the residual decoder 470 (and the weight encoder 1612 and the weight decoder 634) may be trained to reduce or minimize final loss information derived from at least one of the first loss information 2510, the second loss information 2530, or the third loss information 2550.

In detail, the optical flow encoder 410, the residual encoder 430, the optical flow decoder 450, and the residual decoder 470 (and the weight encoder 1612 and the weight decoder 634) may be trained to reduce or minimize final loss information by changing values of pre-set parameters.

According to an embodiment, the final loss information may be calculated according to Equation 4 below.

$$\text{Final loss information} = a*\text{first loss information} + b*\text{second loss information} + c*\text{third loss information} \quad \text{[Equation 4]}$$

In Equation 4, a, b, and c denote weights that are applied to the first loss information 2510, the second loss information 2530, and the third loss information 2550, respectively.

According to Equation 4, it is found that the optical flow encoder 410, the residual encoder 430, the optical flow decoder 450, and the residual decoder 470 (and the weight encoder 1612 and the weight decoder 634) may be trained so that the current reconstructed training image 2560 is as similar as possible to the current training image 2520 and a size of a bitstream corresponding to data output from the optical flow encoder 410 and the residual encoder 430 is minimized.

Figure 26:
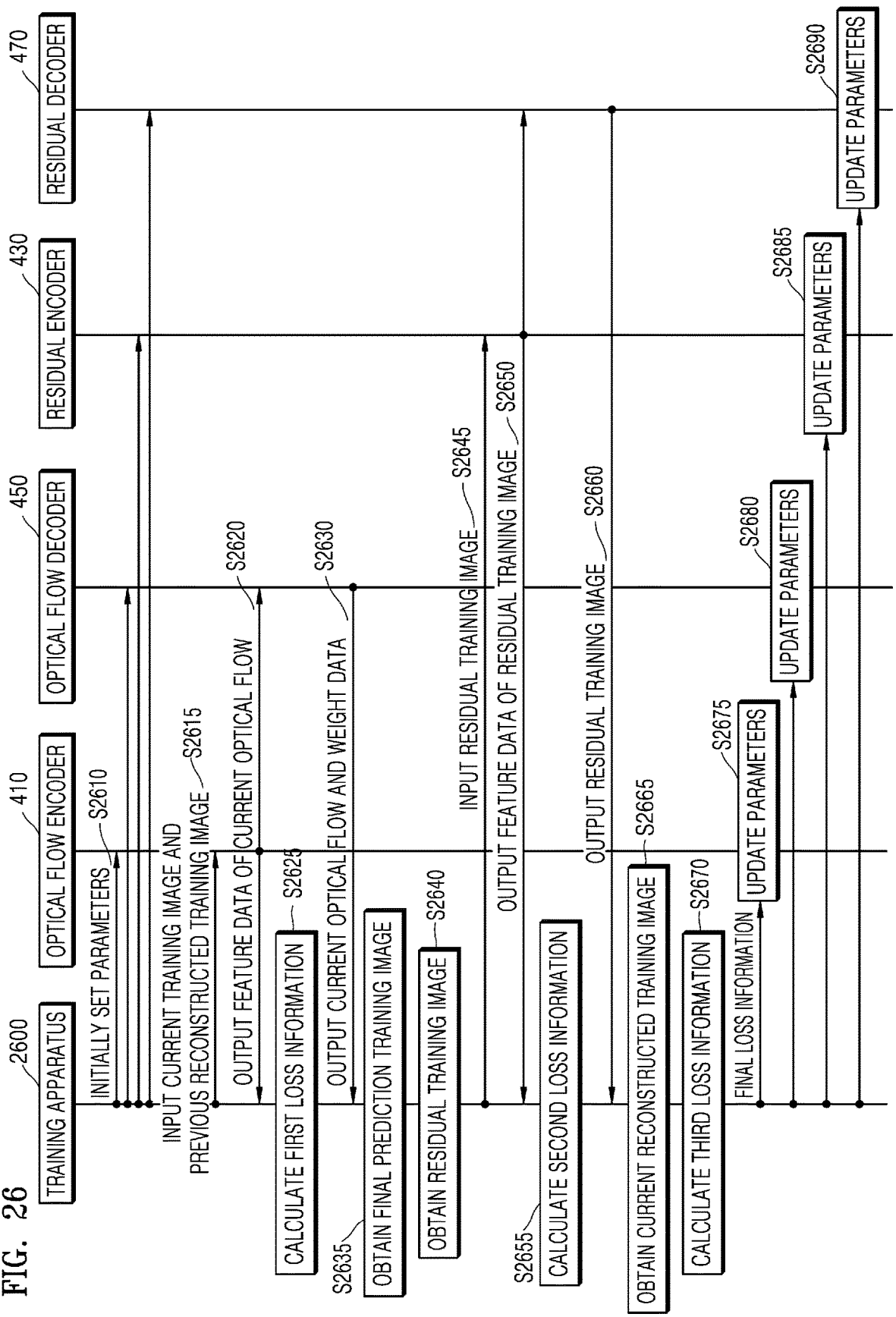
FIG. 26 is a diagram for describing a method, performed by a training apparatus, of training an optical flow encoder, an optical flow decoder, a residual encoder, and a residual decoder, according to an embodiment.

FIG. 26 is a diagram for describing a process, performed by a training apparatus 2600, of training the optical flow encoder 410, the residual encoder 430, the optical flow decoder 450, and the residual decoder 470.

According to an example embodiment, the weight encoder 1612 and/or the weight decoder 634 may also be trained according to the training process illustrated in FIG. 26.

The training process described above with reference to FIG. 25 may be performed by the training apparatus 2600. The training apparatus 2600 may be, for example, the image encoding apparatus 1600 or a separate server. Parameters obtained as a result of training may be stored in the image encoding apparatus 1600 and the image decoding apparatus 600.

Referring to FIG. 26, the training apparatus 2600 may initially set parameters of the optical flow encoder 410, the residual encoder 430, the optical flow decoder 450, and the residual decoder 470 (and the weight encoder 1612 and/or the weight decoder 634) (S2510). Accordingly, the optical flow encoder 410, the residual encoder 430, the optical flow decoder 450, and the residual decoder 470 (and the weight encoder 1612 and/or the weight decoder 634) may operate according to the initially set parameters.

The training apparatus 2600 may input the current training image 2520 and the previous reconstructed training image 2540 to the optical flow encoder 410 (S2615).

The optical flow encoder 410 may output the feature data w of the current optical flow to the training apparatus 2600 and the optical flow decoder 450 by processing the current training image 2520 and the previous reconstructed training image 2540 (S2620).

According to an embodiment, the feature data w of the current optical flow may be input to the weight decoder 634.

According to an embodiment, the current training image 2520 and the previous reconstructed training image 2540 may be input to the weight encoder 1612, and the feature data of the weight data may be output by the weight encoder 1612 to the optical flow decoder 450 or the weight decoder 634.

The training apparatus 2600 may calculate the first loss information 2510 from the feature data w of the current optical flow (S2625).

The optical flow decoder 450 may output the current optical flow g and the weight data t to the training apparatus 2600 by processing the feature data w of the current optical flow (S2630).

According to an embodiment, the weight decoder 634 may process the feature data w of the current optical flow or the feature data t of the weight data to output the weight data to the training apparatus 2600.

The training apparatus 2600 may generate the final prediction training image x" from the previous reconstructed training image 2540 by using the current optical flow g and the weight data t (S2635), and may obtain the residual training image r by using the final prediction training image x" and the current training image 2520 (S2640).

The training apparatus 2600 may input the residual training image r to the residual encoder 430 (S2645).

The residual encoder 430 may output the feature data v of the residual training image r to the residual decoder 470 and the training apparatus 2600 by processing the residual training image (S2650).

The training apparatus 2600 may calculate the second loss information 2530 from the residual training image r or the feature data v of the residual training image (S2655).

The residual decoder 470 may output the reconstructed residual training image r' to the training apparatus 2600 by processing the feature data v of the residual training image (S2660).

The training apparatus 2600 may obtain the current reconstructed training image 2560 by combining the reconstructed residual training image r' with the final prediction training image x" (S2665), and may calculate the third loss information 2550 corresponding to a difference between the current training image 2520 and the current reconstructed training image 2560 (S2670).

The training apparatus 2600 may calculate final loss information by combining at least one of the first loss information 2510, the second loss information 2530, or the third loss information 2550, and the optical flow encoder 410, the residual encoder 430, the optical flow decoder 450, and the residual decoder 470 (and the weight encoder 1612 and the weight decoder 634) may update the initially set parameters through back propagation based on the final loss information (S2675, S2680, S2685, and S2690).

Thereafter, the optical flow encoder 410, the residual encoder 430, the optical flow decoder 450, and the residual decoder 470 (and the weight encoder 1612 and/or the weight decoder 634) may update the parameters while repeating operations S2615 through S2690 until the final loss information is minimized. Accordingly, during each repeated operation, the optical flow encoder 410, the residual encoder 430, the optical flow decoder 450, and the residual decoder 470 (and the weight encoder 1612 and/or the weight decoder 634) may operate according to the parameters updated during a previous process.

In the image encoding apparatus 1600, the image decoding apparatus 600, and the image encoding method and the image decoding method respectively performed by the image encoding apparatus 1600 and the image decoding apparatus 600, according to an embodiment, even when objects included in images are occluded or have large motions or small motions, the images are efficiently encoded and decoded.

In the image encoding apparatus 1600, the image decoding apparatus 600, and the image encoding method and the image decoding method respectively performed by the image encoding apparatus 1600 and the image decoding apparatus 600, according to an embodiment, the bitrate of a bitstream generated as a result of encoding an image is reduced.

In the image encoding apparatus 1600, the image decoding apparatus 600, and the image encoding method and the image decoding method respectively performed by the image encoding apparatus 1600 and the image decoding apparatus 600, according to an embodiment, the bitrate of a bitstream is increased due to a change in brightness between images.

In the image encoding apparatus 1600, the image decoding apparatus 600, and the image encoding method and the image decoding method respectively performed by the image encoding apparatus 1600 and the image decoding apparatus 600, according to an embodiment, an end-to-end encoding and/or decoding system is provided.

An image decoding method based on AI according to an embodiment may include operation S1310 of obtaining the feature data of the current optical flow and the feature data of the current residual image from the bitstream.

The image decoding method may include operation S1320 of obtaining the current optical flow and the first weight data by applying the feature data of the current optical flow to the optical flow decoder 450.

The image decoding method may include operation S1330 of obtaining the current residual image by applying the feature data of the current residual image to the residual decoder 470.

The image decoding method may include operation S1340 of obtaining the preliminary prediction image from the previous reconstructed image, based on the current optical flow.

The image decoding method may include operation S1350 of obtaining a final prediction image by applying the sample values of the first weight data to the sample values of the preliminary prediction image.

The image decoding method may include operation S1360 of obtaining the current reconstructed image corresponding to the current image by combining the final prediction image with the current residual image.

According to an embodiment, the optical flow decoder 450 may be trained such that the sample values of the residual training image or the bitrate of the bitstream including the feature data of the residual training image are decreased, and the residual training image may correspond to a difference between the prediction training image corresponding to the final prediction image and the current training image corresponding to the current image.

According to an embodiment, as a result of the training of the optical flow decoder 450, the smaller a difference between a sample value in the preliminary prediction image and a sample value located at the same position in the current image is, the closer a sample value in the first weight data may be to 1.

According to an embodiment, as a result of the training of the optical flow decoder 450, when the sample value in the preliminary prediction image is greater than the sample value located at the same position in the current image, the sample value in the first weight data may be less than 1.

According to an embodiment, as a result of the training of the optical flow decoder 450, when the sample value in the preliminary prediction image is less than the sample value located at the same position in the current image, the sample value in the first weight data may be greater than 1.

According to an embodiment, when the feature data of the current optical flow is processed by the optical flow decoder, the plurality of current optical flows, the first weight data, and the plurality of second weight data may be obtained.

According to an embodiment, the obtaining of the preliminary prediction image may include operation S1540 of obtaining the plurality of preliminary prediction images from the previous reconstructed image, based on the plurality of current optical flows.

According to an embodiment, the obtaining of the final prediction image may include operation S1550 of obtaining the plurality of modified prediction images by applying the plurality of second weight data to the plurality of preliminary prediction images.

According to an embodiment, the obtaining of the final prediction image may include operation S1560 of obtaining the intermediate prediction image by combining the plurality of modified prediction images with one another.

According to an embodiment, the obtaining of the final prediction image may include operation S1570 of obtaining the final prediction image by applying the sample values of the first weight data to the sample values of the intermediate prediction image.

According to an embodiment, the number of optical flow decoders 450 is plural, and each of the plurality of optical flow decoders may output a pair of current optical flows and second weight data.

According to an embodiment, a sum of sample values located at the same position in the plurality of second weight data may be 1.

The image decoding apparatus 600 based on AI according to an embodiment may include the obtainer 610 for obtaining the feature data of the current optical flow and the feature data of the current residual image from the bitstream.

The image decoding apparatus 600 may include the prediction decoder 630, 630-1, 630-2, 630-3, or 630-4 to obtain the current optical flow and the first weight data by applying the feature data of the current optical flow to an optical flow decoder, obtain the current residual image by applying the feature data of the current residual image to a residual decoder, obtain the preliminary prediction image from the previous reconstructed image, based on the current optical flow, obtain the final prediction image by applying the sample values of the first weight data to the sample values of the preliminary prediction image, and obtain the current reconstructed image corresponding to the current image by combining the final prediction image with the current residual image.

The image encoding method based on AI according to an embodiment may include operation S2010 of obtaining the feature data of the current optical flow by applying the current image and the previous reconstructed image to the optical flow encoder 410.

The image encoding method may include operation S2020 of obtaining the current optical flow and the first weight data by applying the feature data of the current optical flow to the optical flow decoder 450.

The image encoding method may include operation S2030 of obtaining the preliminary prediction image from the previous reconstructed image, based on the current optical flow.

The image encoding method may include operation S2040 of obtaining the final prediction image by applying the sample values of the first weight data to the sample values of the preliminary prediction image.

The image encoding method may include operation S2050 of obtaining the current residual image corresponding to the difference between the final prediction image and the current image.

The image encoding method may include operation S2060 of obtaining the feature data of the current residual image by applying the current residual image to the residual encoder 430.

The image encoding method may include operation S2070 of generating the bitstream including the feature data of the current optical flow and the feature data of the current residual image.

According to an embodiment, when the feature data of the current optical flow is processed by the optical flow decoder 450, the plurality of current optical flows, the first weight data, and the plurality of second weight data may be obtained.

According to an embodiment, the obtaining of the preliminary prediction image may include operation S2230 of obtaining the plurality of preliminary prediction images from the previous reconstructed image, based on the plurality of current optical flows.

According to an embodiment, the obtaining of the final prediction image may include operation S2240 of obtaining the plurality of modified prediction images by applying the plurality of second weight data to the plurality of preliminary prediction images.

According to an embodiment, the obtaining of the final prediction image may include operation S2250 of obtaining the intermediate prediction image by combining the plurality of modified prediction images with one another.

According to an embodiment, the obtaining of the final prediction image may include operation S2260 of obtaining the final prediction image by applying the sample values of the first weight data to the sample values of the intermediate prediction image.

The image encoding apparatus 1600 based on AI according to an embodiment may include the prediction encoder 1610 or 1610-1 that obtains the feature data of the current optical flow by applying the current image and the previous reconstructed image to an optical flow encoder, obtains the current optical flow and the first weight data by applying the feature data of the current optical flow to an optical flow decoder, obtains the preliminary prediction image from the previous reconstructed image, based on the current optical flow, obtains the final prediction image by applying the sample values of the first weight data to the sample values of the preliminary prediction image, obtains the current residual image corresponding to the difference between the final prediction image and the current image, and obtains the feature data of the current residual image by applying the current residual image to a residual encoder.

The image encoding apparatus may include the generator 1620 for generating the bitstream including the feature data of the current optical flow and the feature data of the current residual image.

The image decoding method based on AI according to an embodiment may include operation S1410 of obtaining the feature data of the current optical flow and the feature data of the current residual image from the bitstream.

The image decoding method may include operation S1420 of obtaining the plurality of current optical flows and the plurality of second weight data by applying the feature data of the current optical flow to the optical flow decoder 450.

The image decoding method may include operation S1430 of obtaining the current residual image by applying the feature data of the current residual image to the residual decoder 470.

The image decoding method may include operation S1440 of obtaining the plurality of preliminary prediction images from the previous reconstructed image, based on the plurality of current optical flows.

The image decoding method may include operation S1450 of obtaining the plurality of modified prediction images by applying the sample values of the plurality of second weight data to the sample values of the plurality of preliminary prediction images.

The image decoding method may include operation S1460 of obtaining the final prediction image by combining the plurality of modified prediction images with one another.

The image decoding method may include operation S1470 of obtaining the current reconstructed image corresponding to the current image by combining the final prediction image with the current residual image.

The image encoding method based on AI according to an embodiment may include operation S2110 of obtaining the feature data of the current optical flow by applying the current image and the previous reconstructed image to the optical flow encoder 410.

The image encoding method may include operation S2120 of obtaining the plurality of current optical flows and the plurality of second weight data by applying the feature data of the current optical flow to the optical flow decoder 450.

The image encoding method may include operation S2130 of obtaining the plurality of preliminary prediction images from the previous reconstructed image, based on the plurality of current optical flows.

The image encoding method may include operation S2140 of obtaining the plurality of modified prediction images by applying the sample values of the plurality of second weight data to the sample values of the plurality of preliminary prediction images.

The image encoding method may include operation S2150 of obtaining the final prediction image by combining the plurality of modified prediction images with one another.

The image encoding method may include operation S2160 of obtaining the current residual image corresponding to the difference between the final prediction image and the current image.

The image encoding method may include operation S2170 of obtaining the feature data of the current residual image by applying the current residual image to the residual encoder 430.

The image encoding method may include operation S2180 of generating the bitstream including the feature data of the current optical flow and the feature data of the current residual image.

In the image encoding apparatus 1600, the image decoding apparatus 600, and the image encoding method and the image decoding method respectively performed by the image encoding apparatus 1600 and the image decoding apparatus 600, according to an embodiment, even when objects included in images are occluded or have large motions or small motions, the images may be efficiently encoded and decoded.

In the image encoding apparatus 1600, the image decoding apparatus 600, and the image encoding method and the image decoding method respectively performed by the image encoding apparatus 1600 and the image decoding apparatus 600, according to an embodiment, the bitrate of a bitstream generated as a result of encoding an image may be reduced.

In the image encoding apparatus 1600, the image decoding apparatus 600, and the image encoding method and the image decoding method respectively performed by the image encoding apparatus 1600 and the image decoding apparatus 600, according to an embodiment, the bitrate of a bitstream may be increased due to a change in brightness between images.

In the image encoding apparatus 1600, the image decoding apparatus 600, and the image encoding method and the image decoding method respectively performed by the image encoding apparatus 1600 and the image decoding apparatus 600, according to an embodiment, an end-to-end encoding and/or decoding system may be provided.

The above-described embodiments of the disclosure can be written as computer-executable programs, and the written computer-executable programs can be stored in a machine-readable storage medium.

The machine-readable storage medium may be provided as a non-transitory storage medium. The 'non-transitory storage medium' is a tangible device and only means that it does not contain a signal (e.g., electromagnetic waves). This term does not distinguish a case in which data is stored semi-permanently in a storage medium from a case in which data is temporarily stored. For example, the non-transitory recording medium may include a buffer in which data is temporarily stored.

According to an embodiment of the disclosure, a method according to various disclosed embodiments may be provided by being included in a computer program product. The computer program product, which is a commodity, may be traded between sellers and buyers. Computer program products are distributed in the form of device-readable storage media (e.g., compact disc read only memory (CD-ROM)), or may be distributed (e.g., downloaded or uploaded) through an application store or between two user devices (e.g., smartphones) directly and online. In the case of online distribution, at least a portion of the computer program product (e.g., a downloadable app) may be stored at least temporarily in a device-readable storage medium, such as a memory of a manufacturer's server, a server of an application store, or a relay server, or may be temporarily generated.

While one or more embodiments of the disclosure have been described with reference to the figures, it will be understood by those of ordinary skill in the art that various changes in form and details may be made therein without departing from the spirit and scope as defined by the following claims.

What is claimed is:

1. An image decoding method based on artificial intelligence (AI), the image decoding method comprising:
    obtaining first feature data and second feature data from a bitstream,
    obtaining a current optical flow and first weight data by applying the first feature data to an optical flow decoder;
    obtaining a current residual image by applying the second feature data to a residual decoder;
    obtaining a first prediction image from a previous reconstructed image, based on the current optical flow;
    obtaining a second prediction image by applying a first sample value of the first weight data to a second sample value of the first prediction image; and
    obtaining a current reconstructed image corresponding to a current image by combining the second prediction image with the current residual image.

2. The image decoding method of claim 1, wherein the optical flow decoder is trained to reduce sample values of a residual training image or a bitrate of a bitstream including feature data of the residual training image, and
    wherein the residual training image corresponds to a difference between a final prediction training image corresponding to the second prediction image and a current training image corresponding to the current image.

3. The image decoding method of claim 1, wherein the optical flow decoder is trained such that, the smaller a difference between the second sample value in the first prediction image and a third sample value located at a same position in the current image is, the closer the first sample value in the first weight data is to 1.

4. The image decoding method of claim 1, wherein the optical flow decoder is trained such that when the second sample value in the first prediction image is greater than a third sample value located at a same position in the current image, the first sample value in the first weight data is less than 1.

5. The image decoding method of claim 1, wherein, the optical flow decoder is trained such that, when the second sample value in the first prediction image is less than a third sample value located at a same position in the current image, the first sample value in the first weight data is greater than 1.

6. The image decoding method of claim 1, further comprising:
    obtaining a plurality of current optical flows, the first weight data, and a plurality of second weight data by processing the first feature data by the optical flow decoder,
    wherein the obtaining of the first prediction image comprises:
        obtaining a plurality of first prediction images from the previous reconstructed image, based on the plurality of current optical flows, and
    wherein the obtaining of the second prediction image comprises:
        obtaining a plurality of modified prediction images by applying the plurality of second weight data to the plurality of first prediction images;
        obtaining a third prediction image by combining the plurality of modified prediction images; and
        obtaining the second prediction image by applying the first sample value of the first weight data to a fourth sample value of the third prediction image.

7. The image decoding method of claim 6, wherein the optical flow decoder includes a plurality of optical flow decoders, and
    wherein each of the plurality of optical flow decoders outputs a pair including a current optical flow, among the plurality of current optical flows and second weight data, among the plurality of second weight data.

8. The image decoding method of claim 6, wherein a sum of a plurality of sample values located at a same position in the plurality of second weight data is 1.

9. A computer-readable recording medium having recorded thereon a program which performs the image decoding method of claim 1.

10. An image decoding apparatus based on artificial intelligence (AI), the image decoding apparatus comprising:
    an obtainer configured to obtain first feature data and second feature data from a bitstream, and
    a prediction decoder configured to:
        obtain a current optical flow and first weight data by applying the first feature data to an optical flow decoder,
        obtain a current residual image by applying the second feature data to a residual decoder,
        obtain a first prediction image from a previous reconstructed image, based on the current optical flow,
        obtain a second prediction image by applying a first sample value of the first weight data to a second sample value of the first prediction image, and
        obtain a current reconstructed image corresponding to a current image by combining the second prediction image with the current residual image.

11. An image encoding method based on artificial intelligence (AI), the image encoding method comprising:
    obtaining first feature data by applying a current image and a previous reconstructed image to an optical flow encoder;
    obtaining a current optical flow and first weight data by applying the first feature data to an optical flow decoder;
    obtaining a first prediction image from the previous reconstructed image, based on the current optical flow;

obtaining a second prediction image by applying a first sample value of the first weight data to a second sample value of the first prediction image;

obtaining a current residual image corresponding to a difference between the second prediction image and the current image;

obtaining second feature data by applying the current residual image to a residual encoder; and generating a bitstream comprising the first feature data corresponding to the current optical flow and the second feature data corresponding to the current residual image.

12. The image encoding method of claim 11, further comprising:

obtaining a plurality of current optical flows, the first weight data, and a plurality of second weight data by processing the first feature data by the optical flow decoder, wherein the obtaining of the first prediction image comprises:

obtaining a plurality of first prediction images from the previous reconstructed image, based on the plurality of current optical flows, and wherein the obtaining of the second prediction image comprises:

obtaining a plurality of modified prediction images by applying the plurality of second weight data to the plurality of first prediction images;

obtaining a third prediction image by combining the plurality of modified prediction images; and obtaining the second prediction image by applying the first sample value of the first weight data to a third sample value of the third prediction image.

13. An image encoding apparatus based on artificial intelligence (AI), the image encoding apparatus comprising:

a prediction encoder configured to:

obtain first feature data by applying a current image and a previous reconstructed image to an optical flow encoder, obtain a current optical flow and first weight data by applying the first feature data to an optical flow decoder, obtain a first prediction image from the previous reconstructed image, based on the current optical flow, obtain a second prediction image by applying a first sample value of the first weight data to a second sample value of the first prediction image, obtain a current residual image corresponding to a difference between the second prediction image and the current image, and obtain second feature data by applying the current residual image to a residual encoder; and a generator configured to generate a bitstream comprising the first feature data corresponding to the current optical flow and the second feature data corresponding to the current residual image.

* * * * *